United States Patent
Yasuda et al.

(10) Patent No.: US 7,618,174 B2
(45) Date of Patent: Nov. 17, 2009

(54) VEHICLE LAMP

(75) Inventors: Yuji Yasuda, Shizuoka (JP); Mitsuyuki Mochizuki, Shizuoka (JP); Masashi Tatsukawa, Shizuoka (JP); Hiroyuki Ishida, Shizuoka (JP); Seiichiro Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/061,460

(22) Filed: Apr. 2, 2008

(65) Prior Publication Data

US 2008/0247182 A1 Oct. 9, 2008

(30) Foreign Application Priority Data

Apr. 3, 2007 (JP) ............................. 2007-097774

(51) Int. Cl.
*F21V 33/00* (2006.01)

(52) U.S. Cl. .................. 362/545; 362/512; 362/524; 362/531; 362/544; 362/547

(58) Field of Classification Search ......... 362/512–515, 362/507, 524, 525, 528, 531, 543–545, 549, 362/547

See application file for complete search history.

(56) References Cited

U.S. PATENT DOCUMENTS

| 6,644,842 | B2 * | 11/2003 | Yamaguchi | 362/547 |
| 7,244,057 | B2 * | 7/2007 | Watanabe et al. | 362/544 |
| 2007/0019432 | A1 * | 1/2007 | Shimada | 362/545 |

FOREIGN PATENT DOCUMENTS

| JP | 2004-127782 A | 4/2004 |
| JP | 2004-311224 A | 11/2004 |
| JP | 2005-141918 A | 6/2005 |

* cited by examiner

*Primary Examiner*—Laura Tso
(74) *Attorney, Agent, or Firm*—Sughrue Mion, PLLC

(57) ABSTRACT

In a vehicle lamp including a light source unit at inside of a lamp chamber formed by a lamp body and a transparent front face cover attached to a front opening portion thereof, a light source unit includes a light emitting element supported by a unit mounting portion, an optical unit for irradiating light from the light emitting element to a front side of the vehicle lamp, and a swivel drive mechanism for driving the optical unit without being moved cooperatively with the light emitting element. The light source unit integral with the unit mounting portion and a heat radiating portion is arranged to penetrate the lamp body.

4 Claims, 21 Drawing Sheets

VEHICLE LAMP

This application claims foreign priority from Japanese Patent Application No. 2007-097774 filed on Apr. 3, 2007, the entire contents of which are hereby incorporated by reference.

BACKGROUND OF THE INVENTION

1. Field of the Invention

The present invention relates to a vehicle lamp including a plurality of light source units constituting a light source by a semiconductor light emitting element. The present invention is particularly preferable for a vehicle lamp including a light distribution control mechanism for changing an irradiating direction or an irradiating range in accordance with a running situation.

2. Related Art

In recent years, high brightness formation of a light emitting element has been progressed, and a vehicle lamp adopting the light emitting element as a light source has been started to develop. However, when a light emitting element is constituted by high brightness formation, also a heat generating amount thereof becomes large, a drawback of reducing a light flux or changing a luminescent color is brought about from a temperature characteristic of the light emitting element. Therefore, in a vehicle lamp for forming a light distribution pattern by a plurality of lamp units constituting a light source by a light emitting element, it is necessary to restrain a temperature rise of the light emitting element (refer to Patent References 1, 2).

For example, as shown by FIG. 22A, there is known an inner heat radiating structure. In the heat radiating structure, a plurality of lamp units 503a, 503b, 503c are integrated by a bracket 505 in a lamp chamber 502 formed by a lamp body 500 and a front face cover 501. Heat in the lamp chamber 502 is radiated by attaching a heat sink 507 to the bracket 505. According to the inner heat radiating structure integrally constituting such a lamp unit, when a light distribution control mechanism of an aiming mechanism, a swivel mechanism or the like is adopted (refer to Patent Reference 3). The bracket 505 integrally fixing the lamp units 503a, 503b, 503c is rotated centering on one rotational center axis.

[Patent Reference 1] JP-A-2004-311224
[Patent Reference 2] JP-A-2004-127782
[Patent Reference 3] JP-A-2005-141918

However, according to the inner heat radiating structure of the background art, a restriction of a vehicle lamp inner volume is considerable and there poses a problem that it is difficult to ensure a space of containing the heat sink having a necessary size compatible with a heat generating amount of the light emitting element. On the other hand, when a heat sink having a sufficient heat radiating area is contained, the heat sink is contrary to a request for light-weighted formation, thin size formation of the vehicle lamp.

Contrary thereto, as a related art which is not a prior art, FIG. 22B shows an outer heat radiating structure achieving a high heat radiating function by arranging only the heat sink 507 provided at the bracket 505 at outside of the lamp body 500.

According to the outer heat radiating structure of the related art, the heat sink 507 is arranged outside, and therefore, in comparison with the inner heat radiating structure of radiating heat radiated at inside of the lamp chamber to outside by way of the lamp body or the like, heat is radiated directly to outer air and a high heat radiating effect is achieved.

However, in order to arrange the heat sink 507 at outside, in order to permit to make an aiming mechanism, a swivel mechanism or the like movable, as shown by FIG. 22C, a gap of making the lamp body 500 and the heat sink 507 movable needs to be sealed in watertight by a socket cover 509 and a complicated seal structure is needed.

In addition, the socket cover 509 constituted by an elastic member of rubber or the like becomes hard when a temperature is low, and therefore, a load of driving a swivel actuator or an auto leveling actuator is increased. In addition thereto, according to a swivel operation of providing a plurality of lamp units at a bracket and making a total of the bracket integrally movable, a movable range at inside of the vehicle lamp becomes large, the lamp chamber needs to be enlarged extraneously by that amount, which is contrary to small-sized/thin size formation of the vehicle lamp.

SUMMARY OF THE INVENTION

One or more embodiments of the invention provide a vehicle lamp capable of constituting an outer heat radiating structure, promoting a heat radiating performance and achieving thin size/light-weighted formation of a vehicle lamp without adopting a complicated seal structure.

In accordance with one or more embodiments of the invention, a vehicle lamp is provided with: a lamp body including a front side opening portion; a transparent front face cover attached to the front side opening portion; and a lamp unit disposed in a lamp chamber formed by the lamp body and the transparent front face cover. In the vehicle lamp, the lamp unit is provided with: a light source unit configured to support a light emitting element on a unit mounting portion; an optical unit configured to irradiate light from the light emitting element to a front side of the vehicle lamp; and a drive mechanism configured to drive the optical unit without cooperatively moving with the light emitting element. The light source unit is formed by integrating the unit mounting portion and a heat radiating portion. The light source unit is arranged by penetrating the lamp body.

According to the vehicle lamp having the above-described constitution, the heat radiating portion of the light source unit which is not movable is arranged from the hermetically closed lamp chamber to outside of the lamp body, at inside of the lamp chamber, only the individual optical units are made to be movable separately from the light source units in a fixed state, and therefore, a movable space ensured at inside of the lamp chamber can be made to be necessary minimum, further, also the drive mechanism having a small output can be adopted. Hence, an outer heat radiating structure can be constituted without adopting a complicated seal structure and small-sized/light-weighted formation of the vehicle lamp can be constituted.

Further, in the vehicle lamp having the above-described constitution, the unit mounting portion arranged at inside of the lamp chamber and the heat radiating portion arranged at outside of the lamp chamber may be connected by a heat conducting member penetrating the lamp body.

According to the vehicle lamp having such a constitution, the unit mounting portion supporting the light emitting element is fixed to inside of the lamp chamber, and connected to the heat radiating portion arranged at outside of the lamp body by way of the heat conducting member (a bracket or the like using a highly heat conducting material or the like). Hence, heat from the unit mounting portion of the light source unit is conducted to the heat radiating portion by a short distance and by excellent heat conduction and a high cooling efficiency is achieved. Thereby, in comparison with the inner heat radiating structure, a size of the heat radiating portion can be reduced, which contributes to small-sized/thin size formation of the vehicle lamp.

Further, in the vehicle lamp having the above-described constitution, the heat conducting member may comprise a heat pipe connecting the single unit mounting portion directly attached with a plurality of the light emitting elements and the heat radiating portion.

According to the vehicle lamp having such a constitution, by connecting the single unit mounting portion directly attached with a plurality of light emitting elements and the heat radiating portion by way of the heat pipe, heat transfer between the unit mounting portion and the heat radiating portion is carried out highly efficiently by a work fluid circulated at inside of the heat pipe, and therefore, a through hole of the lamp body for inserting the heat pipe is made to be small.

Further, in the vehicle lamp having the above-described constitution, the optical unit may include a projecting lens arranged on an optical axis extended in a front and rear direction of a vehicle, and a reflector for condensing and reflecting direct light from the light emitting element arranged with a light source to be directed to an upper side to the projecting lens. In addition, the drive mechanism may swivel the reflector and the projecting lens in a left and right direction around a rotating shaft disposed on a front side of the light emitting element.

According to the vehicle lamp having such a constitution, by arranging the rotating shaft on a front side of the light emitting element, the light emitting element can be offset from a focal point of the reflector in swiveling. Thereby, in swiveling, a light distribution making a light distribution pattern proximate in a swiveling direction can be constituted.

Further, in the vehicle lamp having the above-described constitution, the respective light emitting elements of the plurality of light source units may be supported by a common unit mounting portion, and the optical units may be individually set to the respective light emitting elements. In addition, the plurality of optical units may be driven to be moved cooperatively by different strokes by the single drive mechanism.

According to the vehicle lamp having such a constitution, when the plurality of optical units are arranged on a horizontal face, the respective optical units are driven by different swivel amounts (for example, the more to outer side, the more increased the swivel amount), and an additional light distribution pattern is made to be able to be moved by a different angle range in accordance with a steering angle or the like.

According to the vehicle lamp according to the one or more embodiments of the invention, the heat radiating portion of the light source unit which is not movable is arranged from the hermetically closed lamp chamber to outside of the lamp body, at inside of the lamp chamber, only the individual optical units are made to be movable separately from the light source units in the fixed state, and therefore, the movable space ensured at inside of the lamp chamber can be made to be necessary minimum, further, also the drive mechanism having a small output can be adopted.

Therefore, there can be provided a vehicle lamp capable of constituting the outer heat radiating structure without adopting a complicated seal structure and capable of promoting a heat radiating performance and achieving thin size/light-weighted formation of the vehicle lamp.

Other aspects and advantages of the invention will be apparent from the following description, the drawings and the claims.

BRIEF DESCRIPTION OF THE DRAWINGS

FIG. 7 illustrates diagrams perspectively showing a light distribution pattern for low beam formed on a imaginary vertical screen arranged at a position 25 m frontward from a vehicle lamp by light irradiated from the vehicle lamp 1 of the first embodiment in a front direction.

DETAILED DESCRIPTION OF THE EXEMPLARY EMBODIMENTS

Exemplary embodiments of the invention will be explained in details in reference to the attached drawings as follows.

Figure 1:
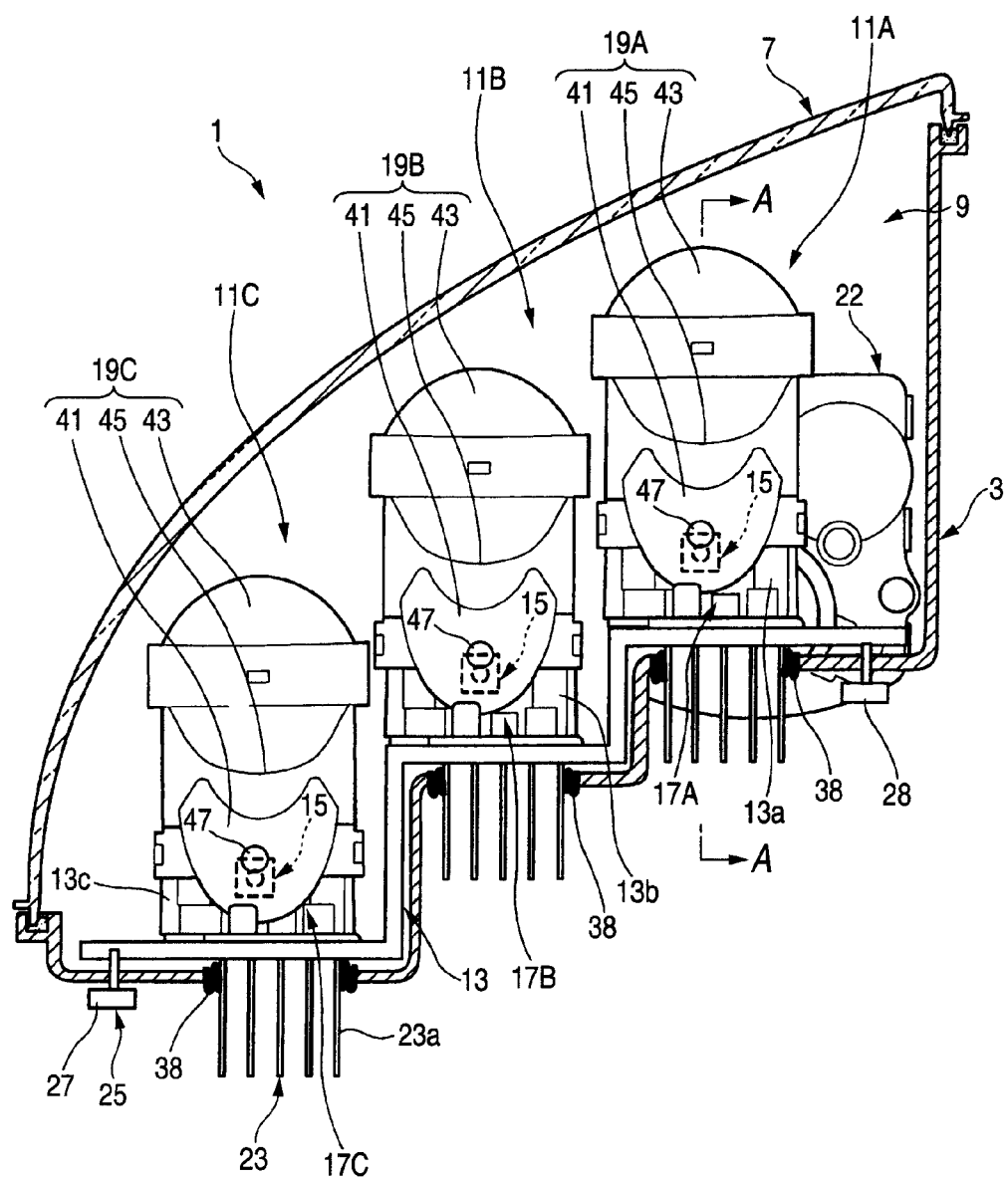
FIG. 1 is a horizontal sectional view of a vehicle lamp according to a first exemplary embodiment of the invention.
Figure 2:
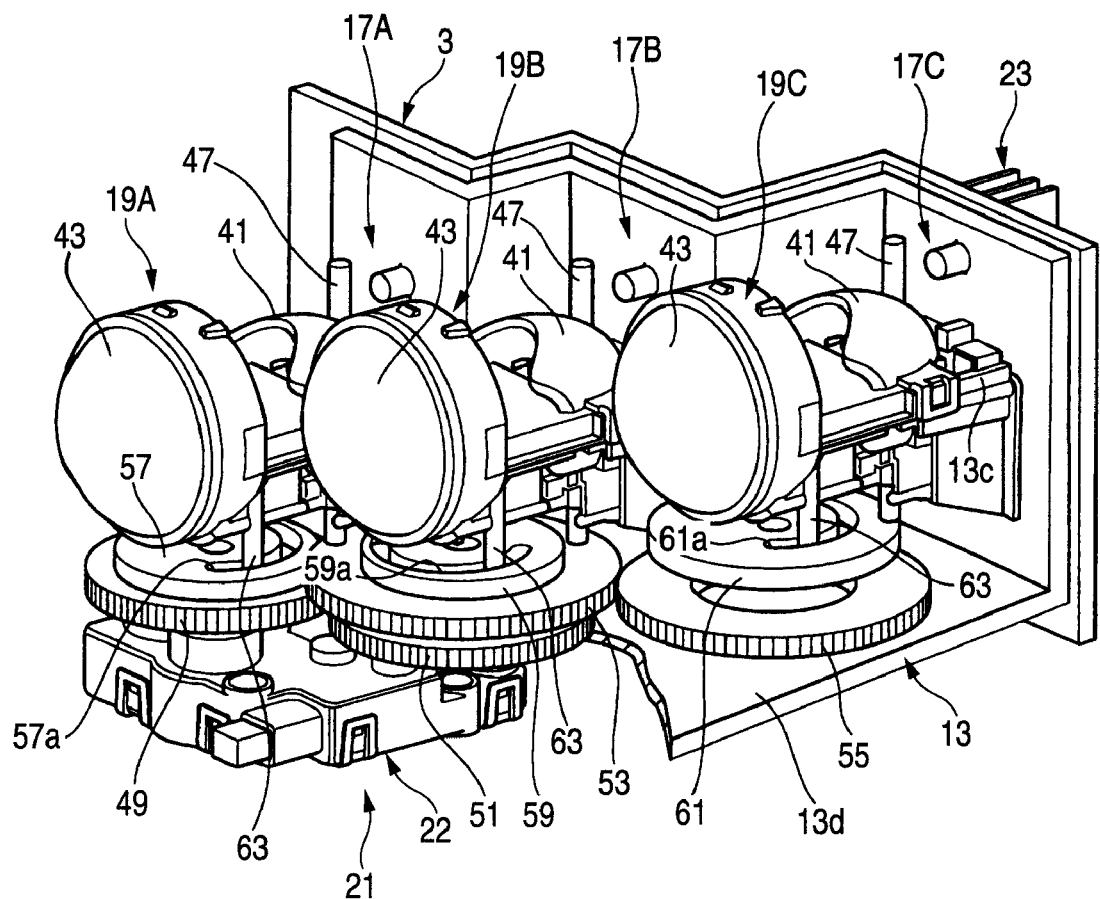
FIG. 2 is a perspective view of an essential portion of the lamp unit shown in FIG. 1.
Figure 3:
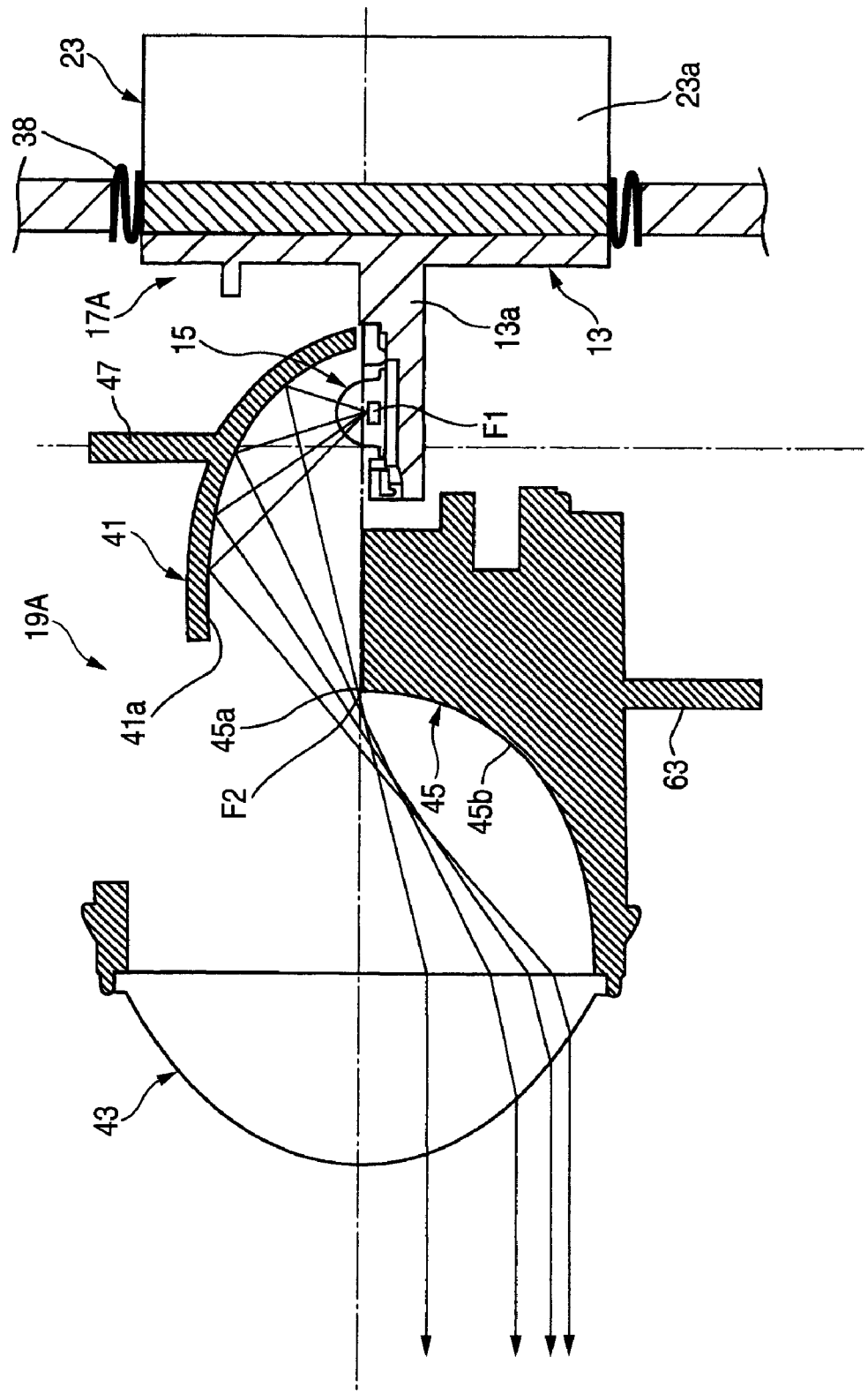
FIG. 3 is a sectional view taken along a line A-A of the lamp unit shown in FIG. 1.
Figure 4:
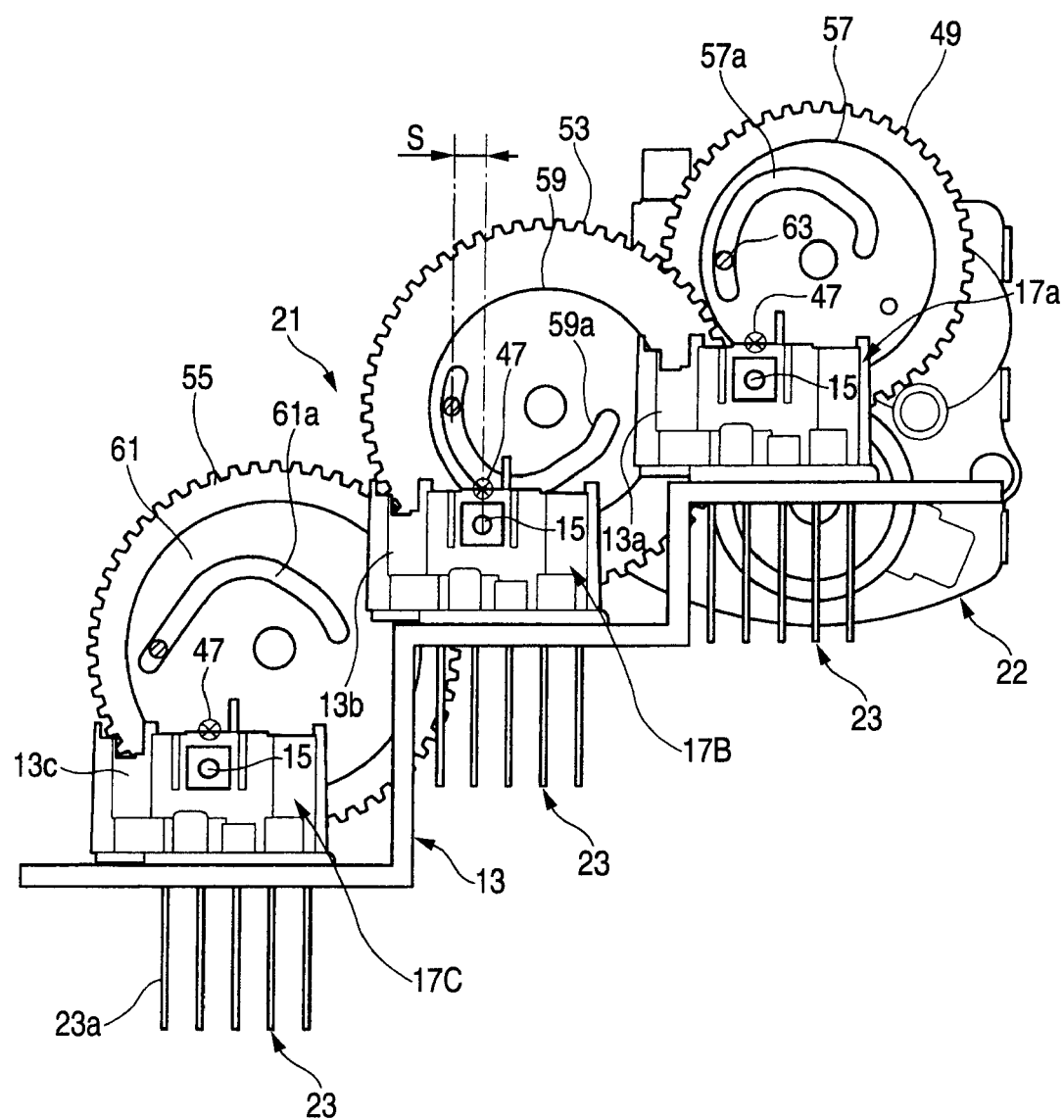
FIG. 4 is a plane view showing a swivel drive mechanism shown in FIG. 2.

FIG. 1 is a horizontal sectional view of a vehicle lamp according to a first exemplary embodiment of the invention, FIG. 2 is a perspective view of an essential portion of a lamp unit shown in FIG. 1, FIG. 3 is a sectional view taken along a line A-A of the lamp unit shown in FIG. 1, and FIG. 4 is a plane view showing a swivel drive mechanism shown in FIG. 2.

As shown by FIG. 1, a vehicle lamp 1 according to the first exemplary embodiment includes a lamp unit at inside of a lamp chamber 9 formed by a lamp body 3 a front side of which is opened and a transparent front face cover 7 attached to a front opening portion thereof.

The lamp unit of the first exemplary embodiment is constituted by a plurality (3 pieces in the exemplary embodiment) of lamp units 11A, 11B and 11C and the lamp units 11A, 11B and 11C are arranged successively from an inner side in a vehicle width direction to an outer side (according to the exemplary embodiment, a constitution of the vehicle lamp arranged on a left side of a vehicle body is shown).

The lamp units 11A, 11B and 11C include light source units 17A, 17B and 17C supporting light emitting elements 15 at respective support portions 13a, 13b and 13c of a unit mounting portion 13, and optical units 19A, 19B and 19C for irradiating light from the respective light emitting elements 15 to a front side of the vehicle lamp, and include a swivel drive mechanism (drive mechanism) 21 for driving to swivel the optical units 19A, 19B and 19C independently without being moved cooperatively with the light emitting elements 15.

The light source units 17A, 17B and 17C are integrally provided with heat radiating portions 23 respectively in correspondence with the support portions 13a, 13b and 13c of the unit mounting portion 13. The heat radiating portion 23 is constituted by, for example, a heat sink or the like made of aluminum and is arranged with a cooling fin 23a penetrating the lamp body 3 at outside thereof.

Further, a front end portion of inside of the lamp chamber 9 is provided with an extension, not illustrated, to surround the lamp units 11A, 11B and 11C.

The unit mounting portion 13 is provided with an aiming mechanism 25 and the aiming mechanism 25 makes the unit mounting portion 13 inclinable in an up and down direction and in a left and right direction by aiming screws 27 and 28 surfaced to a back face of the lamp body 3. Further, a through hole of the lamp body 3 through which the heat radiating portion 23 penetrates is provided with a seal member of a rubber cover 38 or the like for absorbing the movement of the aiming mechanism 25.

Next, constitutions of the lamp units 11A, 11B and 11C will be explained. Further, as shown by FIG. 1 and FIG. 2, the lamp units 11A, 11B and 11C according to the first embodiment are respectively constructed by substantially the same constitution, and therefore, an explanation will be given by taking an example of the lamp unit 11A.

As shown by FIG. 1 through FIG. 3, the lamp unit 11A is constructed by a constitution in which the optical unit 19A is made to be able to swivel in a left and right direction relative to the fixed light source unit 17A.

The lamp unit 17A is constituted by providing the light emitting element 15 constituting a light source at the support portion 13a of the unit mounting portion 13. As described above, the unit mounting portion 13 is fixed with the heat radiating portion 23. The light emitting element 15 is a whit color light emitting diode having a light emitting chip of a size of about 1 mm square, and is arranged to be directed to an upper side in a vertical direction on an optical axis Ax in a state of being supported by a board having a thermal conductivity. The light source unit 17A is fixed to the unit mounting portion 13 and is not moved in swiveling.

On the other hand, as shown by FIG. 3, the optical unit 19A includes a reflector 41, a projecting lens 43, and a shade 45.

The reflector 41 is a member substantially in a shape of a dome provided on an upper side of the light emitting element 15 and is provided with a reflecting face 41a for condensing and reflecting light from the light emitting element 15 to be proximate to the optical axis Ax in a front direction. The reflecting face 41a is formed substantially by a shape of an ellipsoid constituting a center axis thereof by the optical axis Ax. The light emitting element 15 is arranged at a first focal point F1 of an ellipse forming a vertical section of the reflecting face 41a. Further, thereby, the reflecting face 41a condenses and reflects light from the light emitting elements 15 to be proximate to the optical axis Ax in the front direction to be substantially converged to a second focal point of the ellipse.

The projecting lens 43 is constituted by a flat convex lens in which a surface on a front side is constituted by a convex face and a surface on a rear side is constituted by a flat face. The projecting lens 43 is arranged with a rear side focal point F on the optical axis Ax to be disposed slightly on a rear side of the second focal point F2, thereby, an image on a focal point face including the rear side focal point F is projected to a front side as an inverted image.

As shown by FIG. 1 and FIG. 3, the shade 45 is constituted by a shape of a block (lump) serving also as a frame for supporting the projecting lens 43 and the reflecting 41 and a front face 45b directed to a side of the projecting lens 43 is constituted by a curved shape substantially by a shape of an egg shell gradually widening an opening to the front side. Thereby, an end portion (upper end edge) 45a is constituted by a shape formed to be curved into a contour of a concave shape in an upper view thereof along a rear focal point face of the projecting lens 43.

The end portion 45a of the shade 45 is arranged to coincide with the second focal point F2 of the reflector 41. Therefore, the lamp unit 11A projects a predetermined light distribution pattern by reflecting light of the light emitting element 15 by the reflector 41 to be emitted to the front side to reach the reflecting lens 43 by way of the shade 45, thereby, to be emitted to the front side by way of the projecting lens 43.

Next, a gear type drive system of the optical units 19A, 19B and 19C according to the first embodiment will be explained.

The optical units 19A, 19B and 19C are respectively integrally fixed with the reflectors 41, the shades 45 and the projecting lenses 43. The optical units 19A, 19B and 19c are supported by the unit mounting portion 13 independently pivotably by rotating shafts 47 respectively extended in the vertical direction and driven to swivel by the swivel drive mechanism 21.

As shown by FIG. 2 and FIG. 4, a first gear 49 is fixed to an output shaft of an actuator 22 of the swivel drive mechanism 21 provided at a horizontal portion 13d of the unit mounting portion 13, and the first gear 49 is brought in mesh with a second input gear 51. The second input gear 51 is coaxially fixed with a second output gear 53 and the second output gear 53 is brought in mesh with a third gear 55.

Further, the first gear 49 is coaxially fixed with a first cam 57, the second output gear 53 is coaxially fixed with a second cam 59, and the third gear 55 is coaxially fixed with a third cam 61.

The first cam 57, the second cam 59 and the third cam 61 are respectively formed with cam grooves 57*a*, 59*a* and 61*a* and the respective cam grooves 57*a*, 59*a* and 61*a* are provided with cam shapes respectively different from each other.

Further, the cam grooves 57*a*, 59*a* and 61*a* are engaged with driven shafts 63 respectively hung from the optical units 19A, 19B and 19C (according to the embodiment, a lower portion of the shade 45). By forming the cam grooves 57A, 59A and 61A by the shapes different from each other, the respective optical units 19A, 19B and 19C can be driven to rotate by strokes (rotating amounts) different from each other by way of the driven shafts 63 as described later.

That is, as shown by FIG. 4, according to the driven shafts 63 engaged with the cam grooves 57*a*, 59*a* and 61*a*, by respectively rotating the first cam 57, the second cam 59 and the third cam 61, offsets S relative to center lines 65 passing the rotating shafts 47 are changed. Thereby, according to the optical units 19A, 19B and 19C, by rotating the first gear 49 by driving the actuator 22 of the swivel drive mechanism 21, the second output gears 53 and the third gears 55 are rotated centering on the rotating shafts 47 by rotational angles in accordance with the respective cam grooves 57*a*, 59*a* and 61 while being moved cooperatively.

Further specifically, for example, although when the output shaft of the actuator 22 is rotated to the left by 35 degrees in correspondence with right steering of steering, the optical unit 19A is rotated to an inner side by about 7 degrees, the optical units 19B and 19C are maintained to be directed to the front side.

Figure 5:
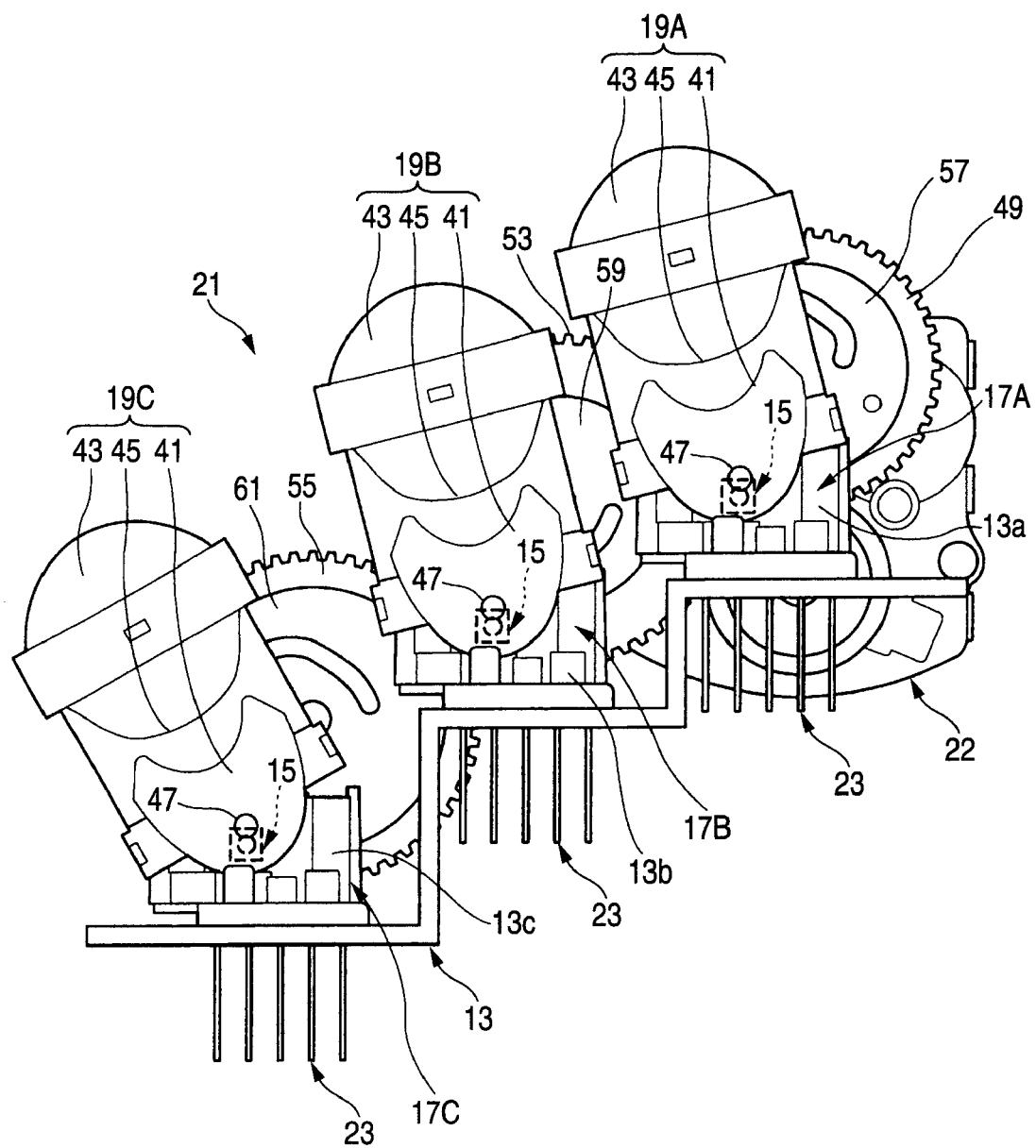
FIG. 5 is a plane view showing a state of rotating an actuator of the swivel drive mechanism to the right by 125 degrees.

Further, when the output shaft of the actuator 22 is rotated to the right by 90 degrees in correspondence with left steering of steering, all of the optical units 19A, 19B and 19C are rotated in an outer direction by 15 degrees. Further, when the output shaft of the actuator 22 is rotated to the right by 125 degrees, as shown by FIG. 5, although the optical units 19A and 19B are rotated in the outer direction by 15 degrees, the optical unit 19C is rotated in the outer direction by 30 degrees.

According to the vehicle lamp 1 of the first exemplary embodiment, the respective light emitting elements 15 of the light source units 17A, 17B and 17C are supported by the common unit mounting portion 13, the optical units 19A, 19B and 19C are individually set to the respective light emitting elements 15, and the plurality of optical units 19A, 19B and 19C are driven to swivel cooperatively by different strokes by the single swivel drive mechanism 21.

Therefore, when the plurality of optical units 19A, 19B and 19C are arranged in a horizontal direction, the respective optical units 19A, 19B and 19C are driven by different swivel amounts (for example, the more to the outside, the more increased the swivel amount) and additional light distribution patterns are made to be able to be moved in angle ranges different from each other in accordance with the steering angle of the vehicle or the like. Thereby, as shown by, for example, FIG. 5 only the optical unit 19C is directed to the outer side in the vehicle width direction to be larger by an amount of a predetermined angle (15 degrees in illustrated example), and therefore, the additional light distribution pattern can be formed in a side direction of a normal light distribution pattern for low beam, and an optical recognizability can be promoted by sufficiently irradiating a front load face in a turning direction.

As described above, according to the vehicle lamp 1 of the first exemplary embodiment, only the heat radiating portions 23 of the light source units 17A, 17B and 17C which are not made to be movable are arranged from the hermetically closed lamp chamber 9 to outside of the lamp body 3, and only the individual optical units 19A, 19B and 19C are made to be movable separately from the light source units 17A, 17B and 17C at inside of the lamp chamber 9, and therefore, a movable space ensured in the lamp chamber 9 can be made to be necessary minimum, further, also the actuator 22 of the swivel drive mechanism 21 having a small output is made to be able to be adopted. Hence, the outer heat radiating structure can be constituted without adopting a complicated seal structure and small-sized/light-weighted formation of the vehicle lamp 1 can be constituted.

Therefore, according to the vehicle lamp 1 of the first exemplary embodiment, the heat radiating performance can be promoted while achieving film thickness formation and light-weighted formation of the thin vehicle lamp.

Further, according to the vehicle lamp 1 of the first exemplary embodiment, the drive system of the optical units 19A, 19B and 19C is constituted by the first gear 49, the second input gear 51, the second output gear 53 and the third gear 55, and the first cam 57, the second cam 59 and the third cam 61 fixed to the first gear 49, the second output gear 53 and the third gear 55 for transmitting a rotational force of the actuator 22 of the swivel drive mechanism 21.

Hence, the individual optical units 19A, 19B and 19C can easily be set to desired rotational angles by forming the cam grooves 57*a*, 59*a* and 61*a* engaged with the driven shafts 63 of the optical units 19A, 19B and 19C by desired offset shapes. Further, by preparing a plurality of sets of the first cams 57, the second cams 59, and the third cams 61 formed by the different cam grooves 57*a*, 59*a* and 61*a* for the first gear 49 and the second output gear 53 and the third gear 55, specifications of vehicle lamps of a plurality of variations carrying out different angle controls can selectively and easily be set.

Further, arbitrarily arrangements of the lamp units 11A, 11B and 11C in the vertical direction can be dealt with by changing lengths of the rotating shafts 47 and the driven shafts 63 of the respective lamp units 11A, 11B and 11C.

Figure 6B:
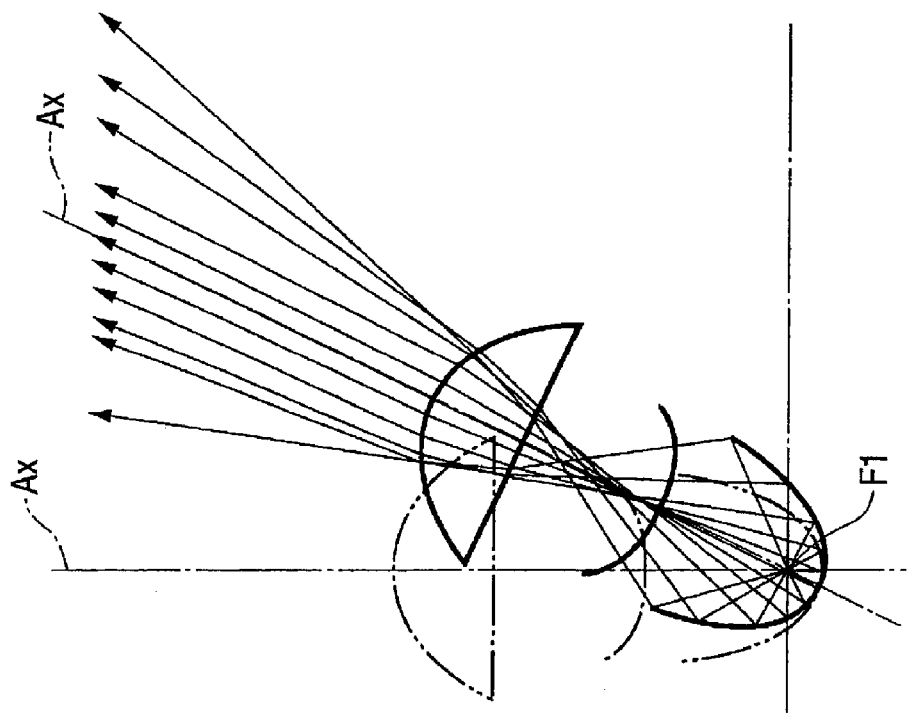
FIG. 6B is a view for explaining the light ray locus when the rotating shaft is set on the light emitting element.
Figure 6A:
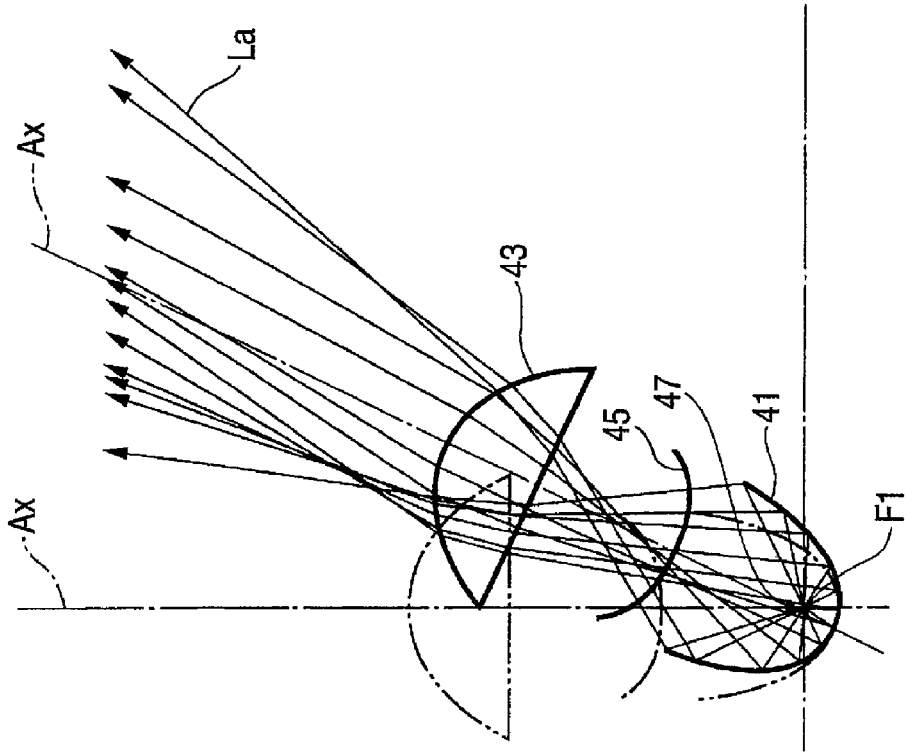
FIG. 6A is a view for explaining a light ray locus when a rotating shaft is set on a front side of a light emitting element.
Figure 7A:
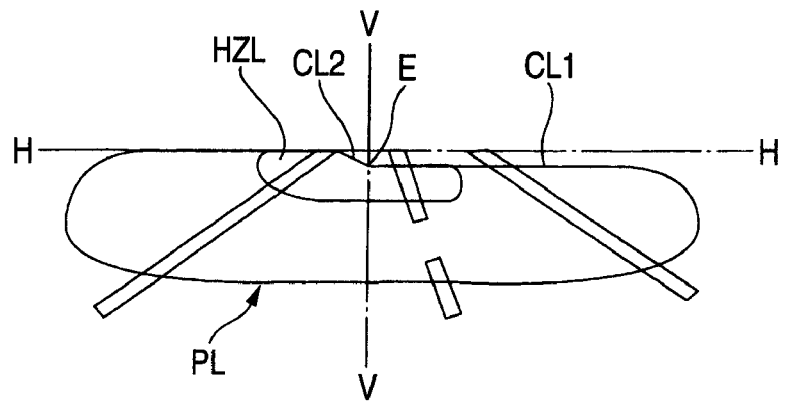
FIG. 7A shows a light distribution pattern in straight advancing.
Figure 7B:
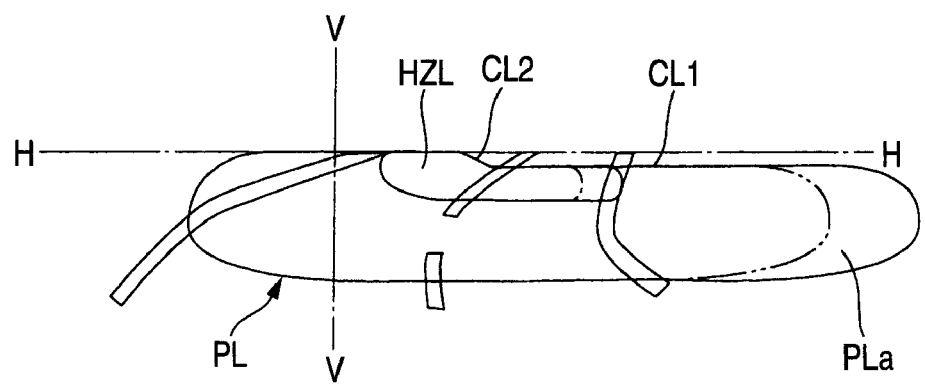
FIG. 7B shows a light distribution pattern in curving to the right.
Figure 8:
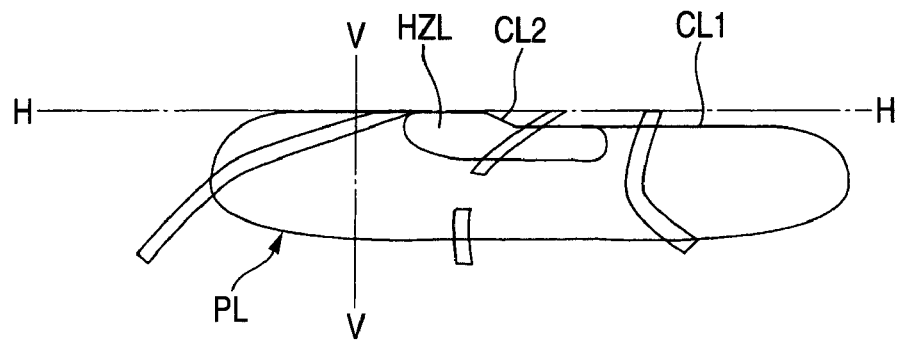
FIG. 8 is a diagram for explaining a light distribution pattern when the rotating shaft is installed on a front side of the light emitting element.

FIG. 6A is a view for explaining a light ray locus when the rotating shaft is set on a front side of the light emitting element, FIG. 6B is a view for explaining a light ray locus when the rotating shaft is set on the light emitting element, and FIGS. 7A and 7B illustrate diagrams each perspectively showing a light distribution pattern for low beam formed on an imaginary vertical screen arranged at a position of 25 m frontward from the vehicle lamp by light irradiated from the vehicle lamp 1 of the first embodiment in the front direction, FIG. 7A shows a light distribution pattern in straight advancing and FIG. 7B shows a light distribution pattern in curving to the right. FIG. 8 is a diagram showing a light distribution pattern in curving to the right when the rotating shaft is set on the light emitting element.

A light distribution pattern PL of the vehicle lamp 1 of the exemplary embodiment shown in FIGS. 7A and 7B is a light distribution pattern for low beam for passing on the left side, and the straight advancing light distribution shown in FIG. 7A includes a horizontal cutoff line CL1 at an upper end edge thereof and a skewed cutoff line CL2 rising from the horizontal cutoff line CL1 by a predetermined angle (for example, about 15°). A position of an elbow point E constituting an intersection of the two cutoff lines CL1 and CL2 is set to a position downward from H-V constituting a vanishing point in the front direction of the vehicle lamp by about 0.5 through 0.6°.

Further, the light distribution pattern PL for low beam is formed with a hot zone HZL constituting a high luminous intensity region to surround the elbow point E. The light distribution pattern for low beam PL is formed by the shade 45, and the horizontal and the skewed cutoff lines CL1 and CL2 are formed as an inverted projected image of the end portion 45*a* of the shade 45.

Meanwhile, as the swivel drive mechanism, as shown by FIG. 6B, there is known a vehicle lamp for fixing a light emitting element at the first focal point F1 of the reflector 21, and rotating a total of the lamp unit centering on the light emitting element. In this case, as shown by FIG. 8, the swiveled light distribution pattern PL is hardly changed and only the direction of the optical axis Ax is changed.

In contrast thereto, according to the vehicle lamp 1 according to the exemplary embodiment, as shown by FIG. 7A, the swivel drive mechanism 21 swivels the respective reflectors 41 and the projecting lenses 43 of the optical units 19A, 19B and 19C in the left and right direction centering on the rotating shafts 47 set on the front side of the right emitting elements 15 (refer to FIG. 1 and FIG. 3).

Therefore, when the optical units 19A, 19B and 19C are swiveled, in comparison with the vehicle lamp rotating the total of the unit centering on the light emitting element shown in FIG. 6B, a light flux La diffused in the rotational direction (horizontal direction) in FIG. 6A is provided.

By arranging the rotating shaft 47 on the front side of the light emitting element 15 in this way, in swiveling, the first focalpoint F1 of the reflector 41 can be offset (displaced) relative to the light emitting element 15. Thereby, as shown by FIG. 7B, an additional light distribution PLa of shifting the light distribution pattern PL in a swivel direction can be provided in swiveling.

Next, a vehicle lamp according to a second exemplary embodiment will be explained.

Figure 9:
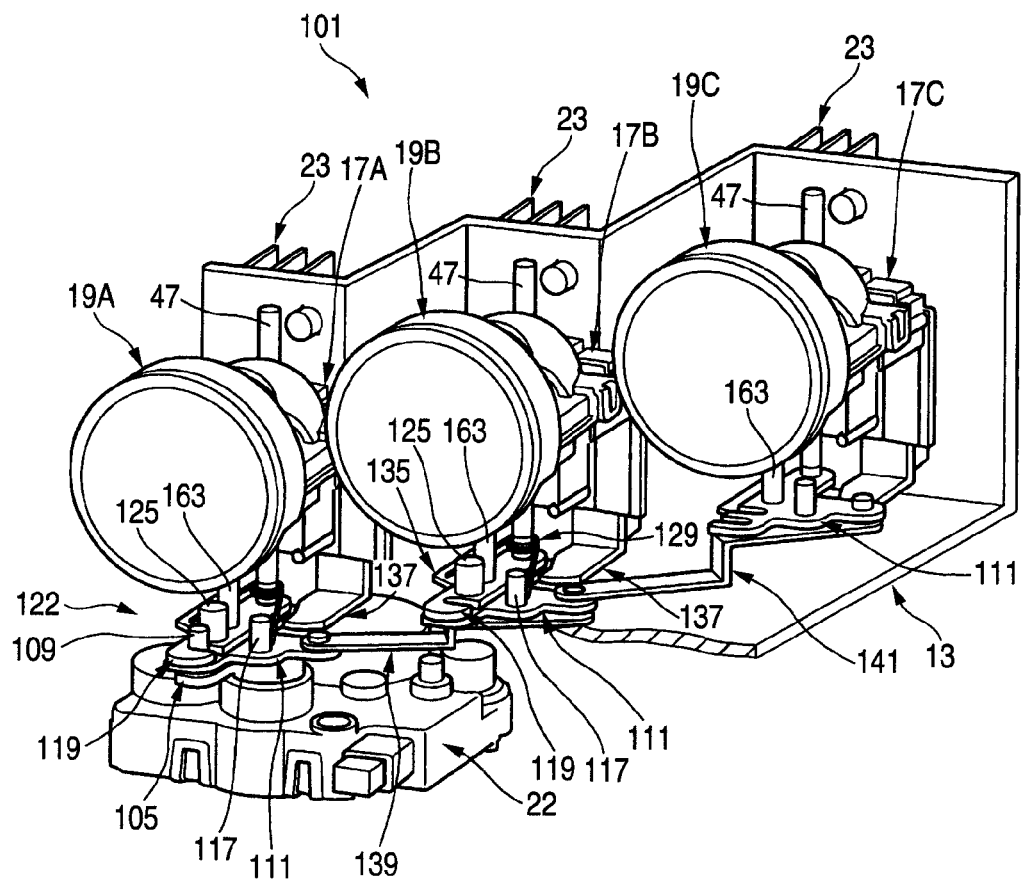
FIG. 9 is a perspective view of an essential portion of a vehicle lamp according to a second exemplary embodiment.
Figure 10:
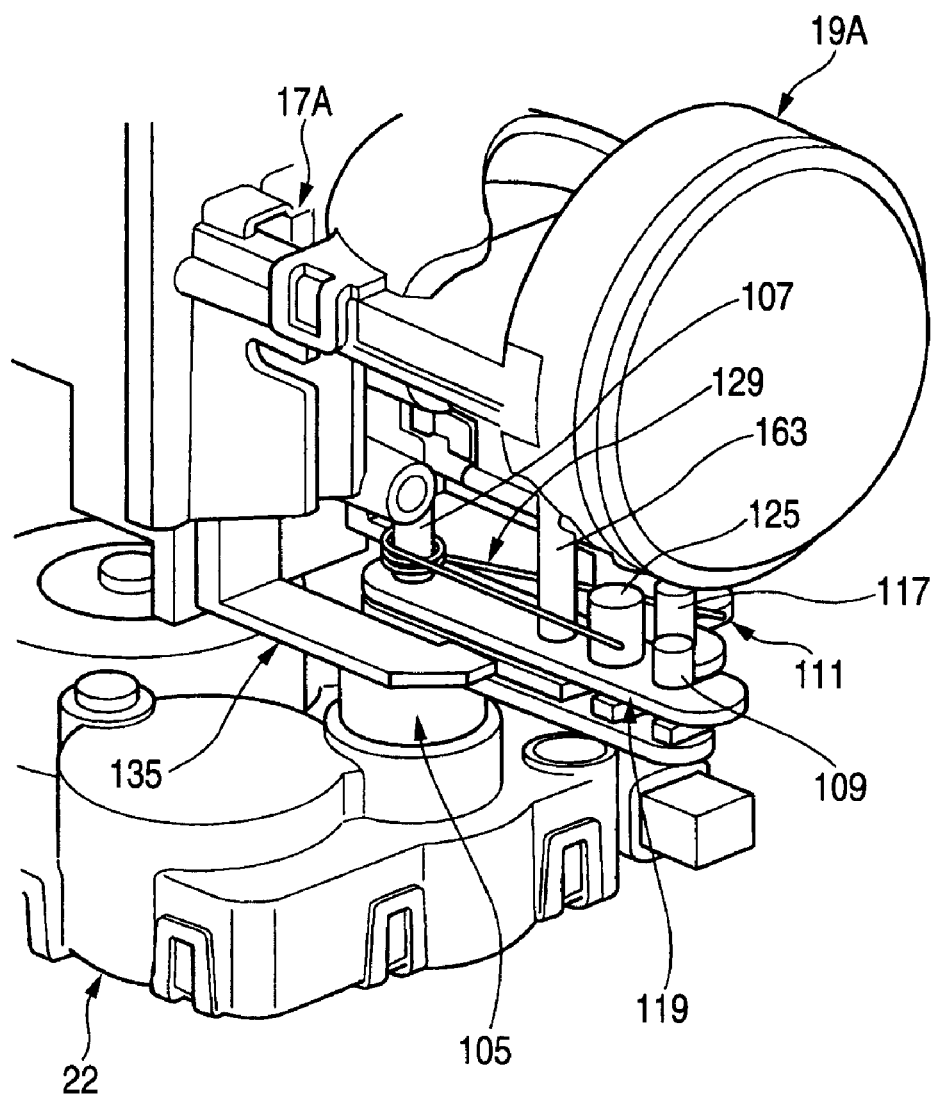
FIG. 10 is a perspective view enlarging an essential portion of a link portion shown in FIG. 9.
Figure 11:
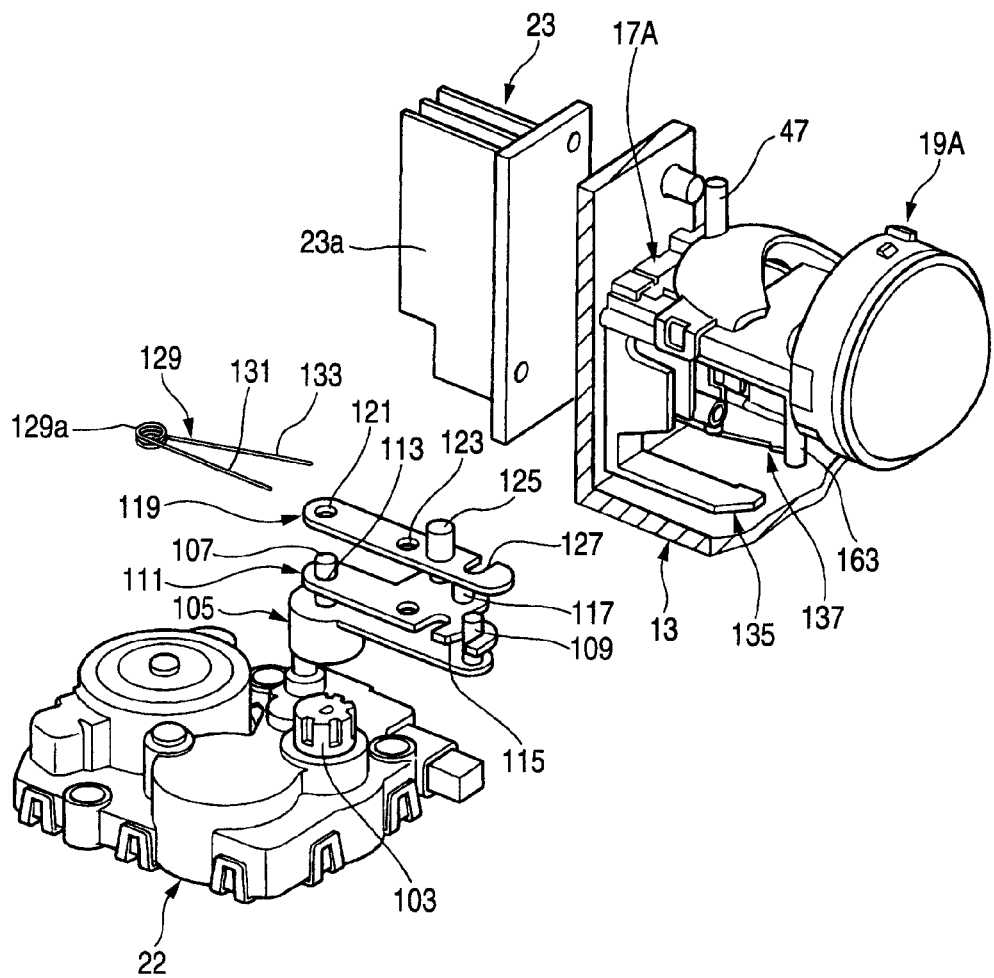
FIG. 11 is a disassembled perspective view of the link portion shown in FIG. 10.

FIG. 9 is a perspective view of an essential portion of the vehicle lamp according to the second exemplary embodiment, FIG. 10 is a perspective view enlarging an essential portion of a link portion shown in FIG. 9, and FIG. 11 is a disassembled perspective view of the link portion shown in FIG. 10. Further, constituent members substantially similar to those of the vehicle lamp according to the first exemplary embodiment are attached with the same notations and a detailed explanation thereof will be omitted.

A vehicle lamp 101 according to the second exemplary embodiment is similar to the vehicle lamp 1 except that a drive system of the optical unit 19A, 19B and 19C differ from the constitution of the first exemplary embodiment.

A swivel drive mechanism 122 of the vehicle lamp 101 drives to swivel the respective optical units 19A, 19B and 19C by desired rotational angles by adopting a link mechanism.

As shown by FIG. 9 through FIG. 11, an output shaft 103 of the actuator 22 provided at the horizontal portion 13*d* of the unit mounting portion 13 is fixed with a base end of an actuator link 105. A support shaft 107 coaxial with the output shaft 103 and a press shaft 109 disposed on an outer side of a rotational radius of the support shaft 107 are hung from the actuator link 105.

A middle link 111 is arranged right above the actuator link 105, and the middle link 111 outwardly inserts a support hole 113 of a base end to the support shaft 107. A front end of the middle link 111 is formed with a middle link C shape notch portion 115 opened in a pivoting direction of the press shaft 109 of FIG. 11 in the clockwise direction, and the middle link C shape notch portion 115 is engaged with the press shaft 109 of the actuator link 105. That is, the middle link 111 is driven by the actuator link 105 pivoted in the counterclockwise direction. Further, a spring receive projection 117 is hung from a front end of the middle link 111 and the spring receive projection 117 is locked with a pinching streak 133 of a torsional coil spring 129 mentioned later.

An optical unit side link 119 is arranged right above the middle link 111, and the optical unit side link 119 outwardly inserts a support hole 121 to the support shaft 107 of the actuator link 105. A force point shaft engaging hole 123 is bored on an outer side of a rotational radius of the support hole 121 of the optical unit side link 119, and the force point shaft engaging hole 123 is fitted with a force point shaft 163 of the optical unit 19A.

A spring receive projection 125 is erected on an outer side of a rotational radius of the force point shaft engaging hole 123, and the spring receive projection 125 is locked with the pinching streak 131 of the torsional coil spring 129 mentioned later. An outer side in a rotational radius of the spring receive projection 125 is formed with an optical unit side link C shape notch portion 127 opened in a pivoting direction of the press shaft 109 of FIG. 11 in the counter clockwise direction, and the optical unit side link C shape notch portion 127 is engaged with the press shaft 109 of the actuator link 105. That is, the optical unit side link 119 is driven by the actuator link 105 pivoted in the clockwise direction.

The rotating shaft 47 of the optical unit 19A is arranged coaxially with the output shaft 103 of the actuator 22, and the support shaft 107 of the actuator link 105. Further, the actuator link 105, the middle link 111 and the optical unit side link 119 are pivoted centering on a base end coaxially supported by the output shaft 103 of the actuator 22.

Hence, the actuator link 105 constitutes a drive output side, the middle link 111 is engaged only with rotation in the counterclockwise direction of the actuator link 105 and the optical unit side link 119 is engaged with only rotation in the clockwise direction of the actuator link 105.

As shown by FIG. 10, a twist portion 129*a* of the torsional coil spring 129 is outwardly inserted to the support shaft 107 of the actuator link 105 and a pair of pinching streaks 131 and 133 are extended from the twist portion 129*a*. The twist coil spring 129 outwardly inserting the twist portion 129*a* to the support shaft 107 is locked by the spring receive projection 125 of the optical unit side link 119 and the other pinching streak 135 is locked by the spring receive projection 117 of the middle link 111, and the spring receive projection 125 and the spring receive projection 117 are urged in directions of being pinched.

Further, a middle link stopper 135 and an optical unit side link stopper 137 are hung from a lower portion of the right source unit 17A paired with the optical unit 19A. The middle link stopper 135 restricts rotation in the clockwise direction of the middle link 111 and the optical unit side link stopper 137 restricts rotation of the optical unit side link 119 by 15 degrees or more in the counterclockwise direction.

As shown by FIG. 9, the optical unit 19A is provided with the middle link 111, the optical unit side link 119, the torsional coil spring 129, the middle link stopper 135, and the optical unit side link stopper 137. The optical unit 19C is provided with only the middle link 111.

Further, according to the optical unit 19A and the optical unit 19B, the middle links 111 are connected by a connecting link 139, and according to the optical unit 19B and the optical unit 19C, the middle links 111 are connected by a connecting link 141.

Next, an explanation will be given of the link type drive system of the optical units 19A, 19B and 19C according to the second exemplary embodiment.

As shown by FIG. 9, normally all of the optical units 19A, and 19B and 19C are directed in a straight advancing direction. Here, for example, when the output shaft 103 of the actuator 22 is rotated to the left by 15 degrees in correspondence with left steering of steering, the actuator link 105 is rotated to the left by 15 degrees and also the middle link 111 engaged with the press shaft 109 is rotated to the left by 15 degrees.

By rotating the middle link 111 to the left by 15 degrees, the optical unit side link 119 is rotated to the left by 15 degrees by way of the torsional coil spring 129 for pinching the spring receive projection 117 of the middle link 111 and the spring receive projection 125 of the optical unit side link 119. Thereby, as shown by FIG. 12, the optical unit 19A fitting the force point shaft 163 to the force point shaft engaging hole 123 of the optical unit side link 119 is rotated to the left by 15 degrees.

Further, also the optical units 19B and 19C are similarly rotated to the left by 15 degrees by way of the middle link 111 of the optical unit 19B connected to the middle link 111 of the optical unit 19A by way of the connecting link 139 and the middle link 111 of the optical unit 19C connected thereto by way of the connecting link 141. At this occasion, the optical unit side links 119, 119 of the optical units 19A, 19B are brought into a state of restricting left rotation equal to or larger than 15 degrees by being brought into contact with the respective optical unit side link stoppers 137, 137.

Figure 12:
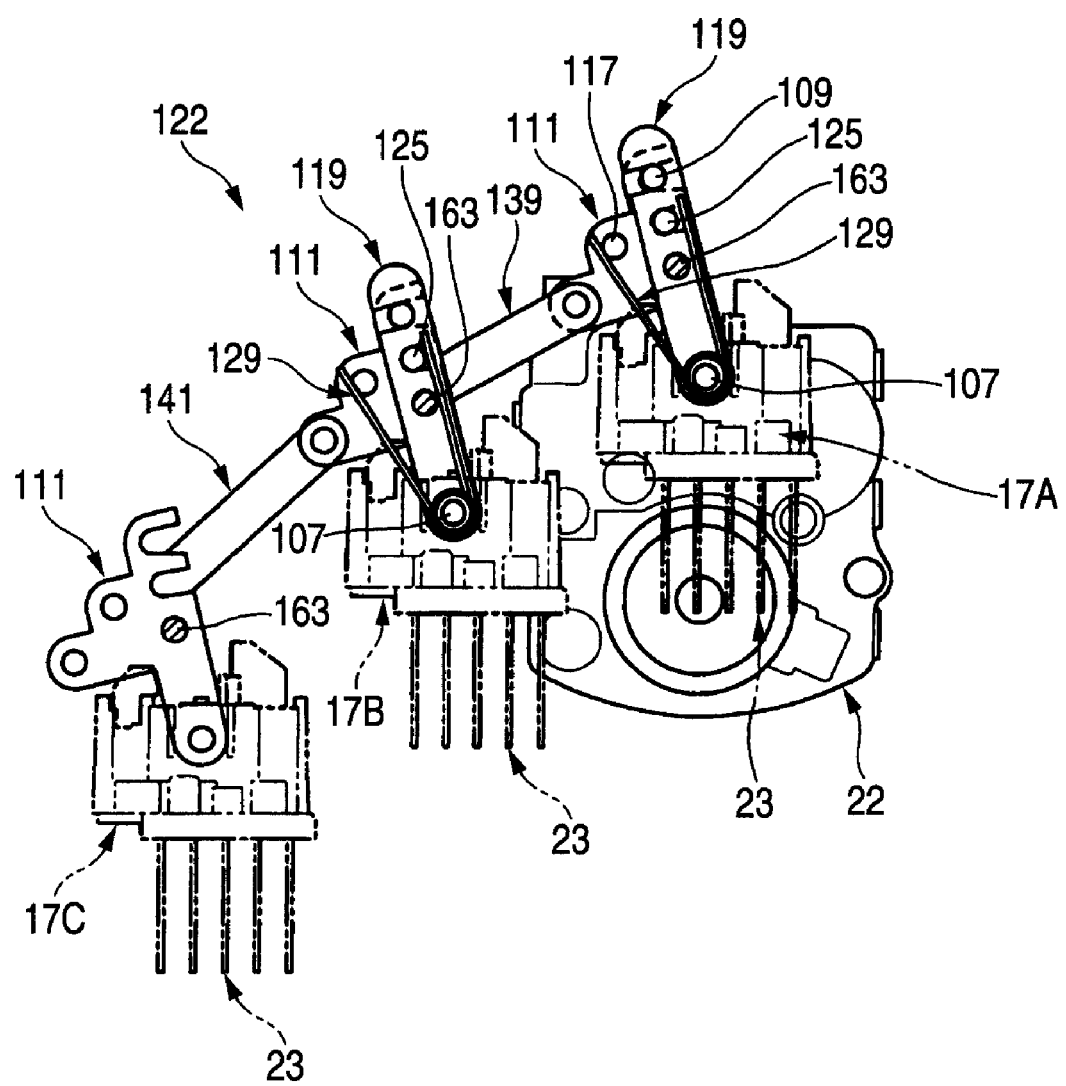
FIG. 12 is a plane view of the link portion directing all of optical units to an outer side by 15 degrees.
Figure 13:
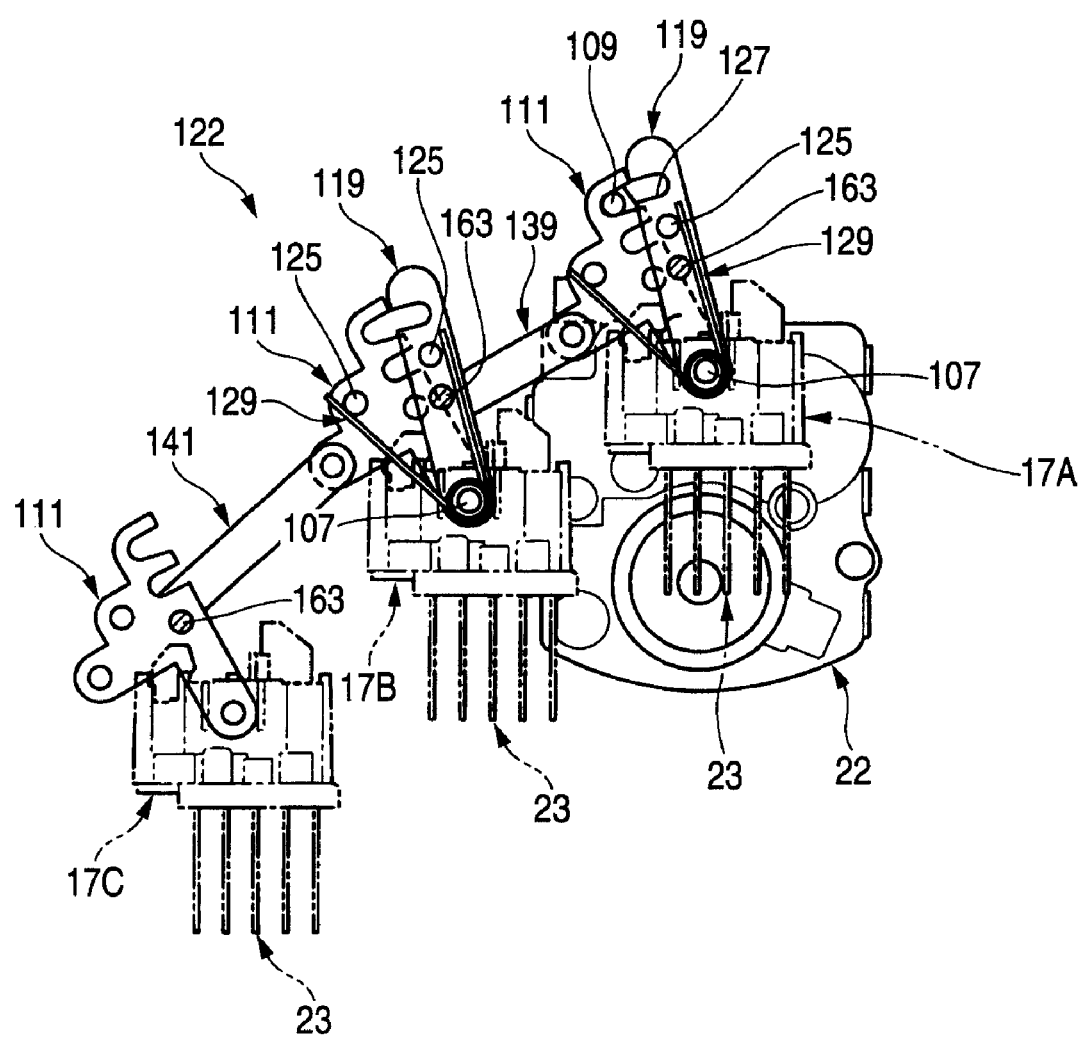
FIG. 13 is a plane view of the link portion directing two optical units on an inner side to an outer side by 15 degrees and directing an optical unit on an outer side to the outer side by 30 degrees.

When the output shaft 103 of the actuator 22 is further rotated to the left by 15 degrees from the state of FIG. 12 (rotated to the left by 30 degrees by a total from an initial state), as shown by FIG. 13, whereas the optical unit side links 119, 119 of the optical units 19A and 19B are maintained at the rotational angle as they are by restricting the rotation by the optical unit side link stoppers 137, 137, the press shaft 109 of the actuator link 105 is disengaged from the optical unit side link C shape notch portion 127 of the optical unit side link 119 to press the middle link C shape notch portion 115. Hence, the middle link 111 is further rotated to the left by 15 degrees against an urge force of the torsional coil spring 129. That is, the middle link 111 of the optical unit 19A and the optical unit 19B widen the torsional coil springs 129, 129 to rotate to the left by 30 degrees. Thereby, the two optical units 19A and 19B on an inner side are rotated by 15 degrees to the outer side and only one of the optical unit 19C on the outer side is rotated to the outer side by 30 degrees.

In contrast thereto, for example, when the output shaft 103 of the actuator 22 is rotated to the right by 10 degrees inversely from the initial state directed in the straight advancing direction shown by FIG. 9 in correspondence with right steering of steering, the middle link 111 of the optical unit 19A is brought into contact with the middle link stopper 135 to restrict rotation. On the other hand, according to the actuator link 105 of the optical unit 19A, the press shaft 109 is disengaged from the middle link C shape notch portion 115 to be rotated to the right by 10 degrees against the urge force of the torsional coil spring 129.

Figure 14:
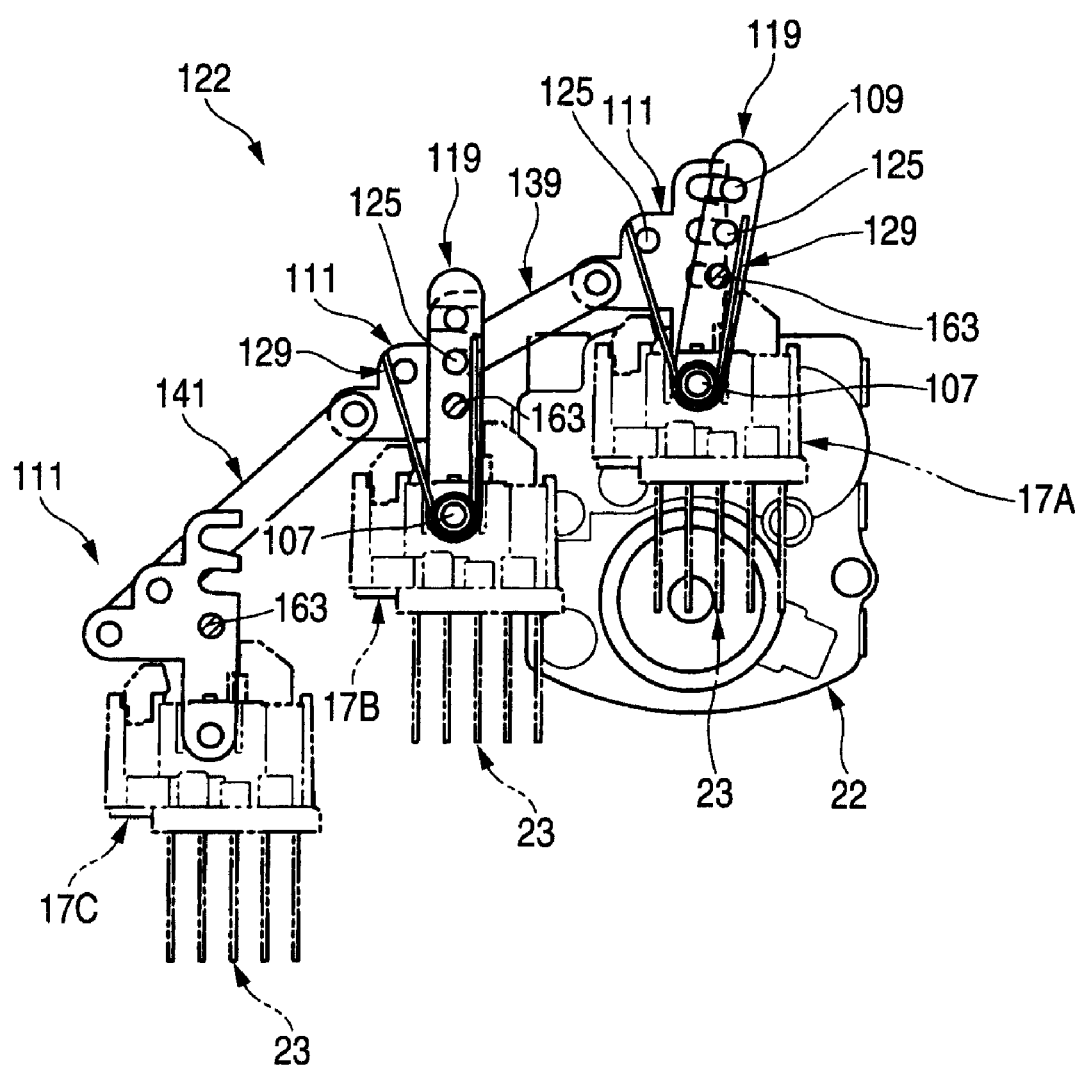
FIG. 14 is a plane view of the link portion directing one optical unit on an inner side to an inner side by 10 degrees and directing two optical units on an outer side in a straight advancing direction.

Thereby, also the optical unit side link 119 engaging the press shaft 109 to the optical unit side link C shape notch portion 127 is rotated to the right by 10 degrees. That is, as shown by FIG. 14, whereas the two optical units 19B and 19C on the outer side maintain to be directed in the straight advancing direction since the middle links 111 are not pivoted, the one optical unit 19A on the inner side is rotated to the right by 10 degrees by the optical unit side link 119.

According to the vehicle lamp 101 including the link type drive system, there is achieved an effect of promoting the heat radiating performance while achieving thin thickness formation and light-weighted formation similar to those of the vehicle lamp 1 of the first exemplary embodiment. Further, in comparison with a constitution of using a number of gears, the embodiment is constituted by link plates having thin thicknesses, and therefore, the individual optical plates 19A, 19B and 19C can be set to desired rotational angles independently from each other by a light-weighted mechanism.

Next, a vehicle lamp according to a third exemplary embodiment will be explained.

Figure 15:
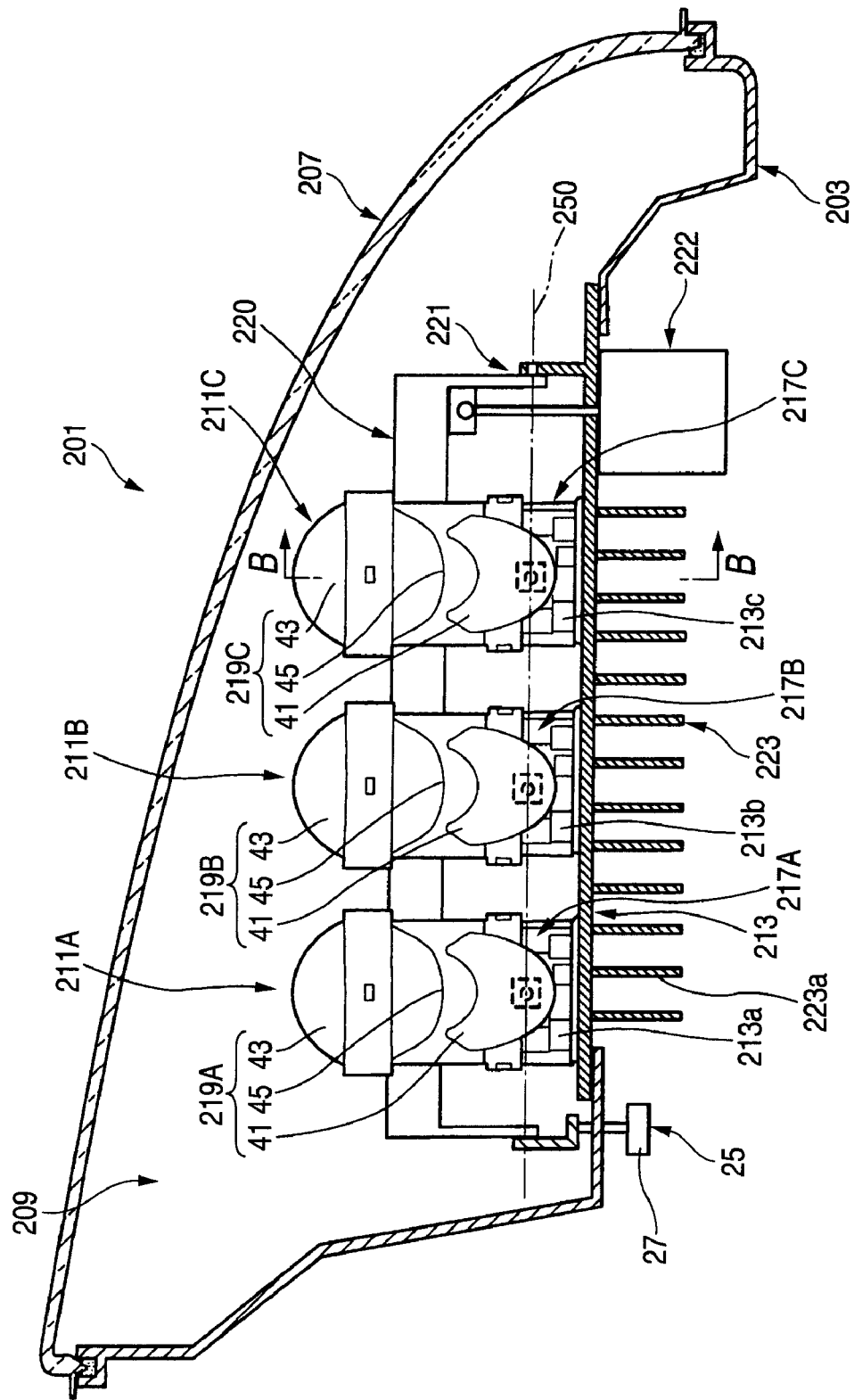
FIG. 15 is a horizontal sectional view of a vehicle lamp according to a third exemplary embodiment.
Figure 16:
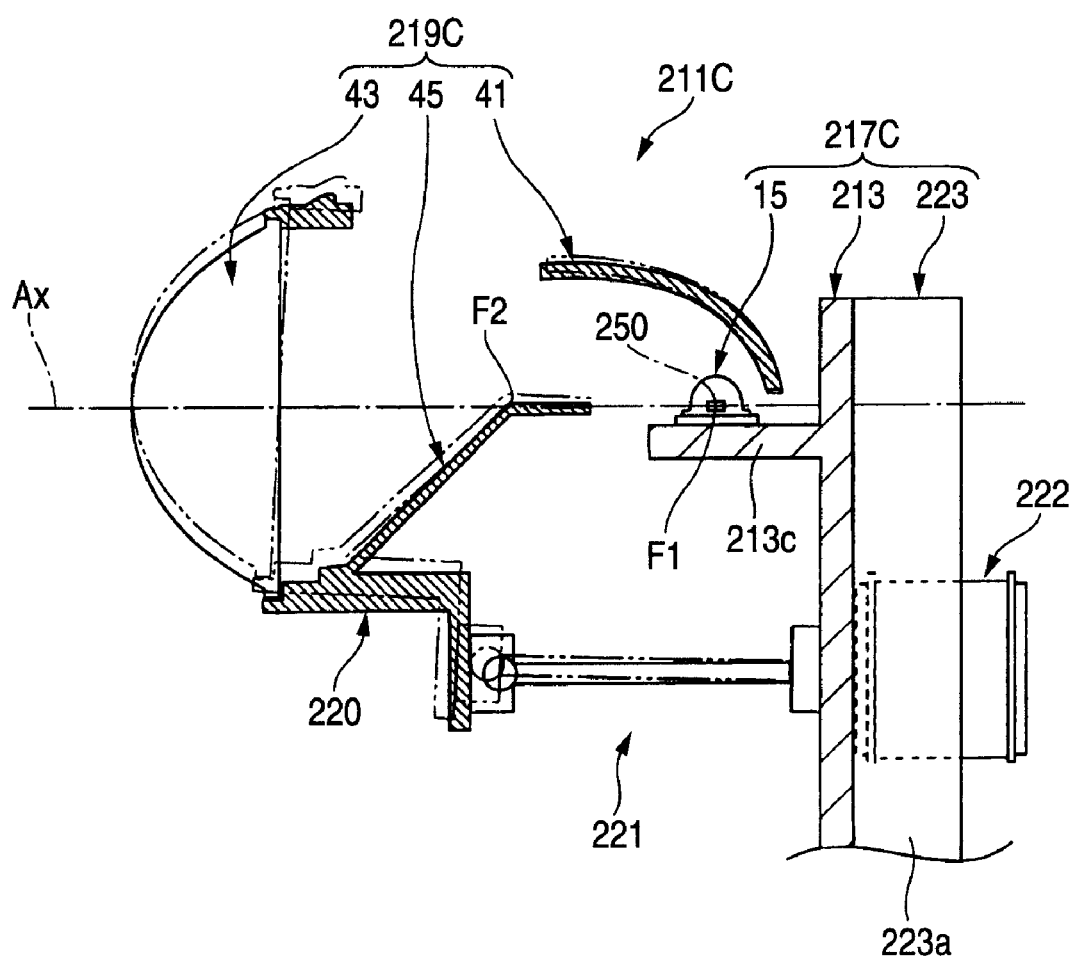
FIG. 16 is a sectional view taken along a line B-B of a lamp unit shown in FIG. 15.

FIG. 15 is a horizontal sectional view of a vehicle lamp according to the third exemplary embodiment, and FIG. 16 is a sectional view taken along a line B-B of the lamp unit shown in FIG. 15. Constituent members substantially similar to those of the vehicle lamp of the first embodiment are attached with the same notations and a detailed explanation thereof will be omitted.

As shown by FIG. 15, a vehicle lamp 201 according to the third exemplary embodiment includes a lamp unit at inside of a lamp chamber 209 formed by lamp body 203 a front side of which is opened and a transparent front face cover 207 attached to the front opening portion.

The lamp unit of the third exemplary embodiment is constituted by a plurality (3 pieces in the exemplary embodiment) of lamp units 211A, 211B and 211C, and the lamp units 211A, 211B and 211C are arranged successively from an inner side to an outer side in a vehicle width direction (according to the exemplary embodiment, a constitution of a vehicle lamp arranged on a right side of a vehicle body is shown).

The lamp units 211A, 211B and 211C include light source units 217A, 217B and 217C supporting the light emitting elements 15 at respective support portions 213a, 213b and 213c of a unit mounting portion 213, and optical units 219A, 219B and 219C for irradiating light from the respective light emitting elements 15 to a front side of the vehicle lamp and includes a leveling drive mechanism (drive mechanism) 221 for driving to level independently without moving the optical units 219A, 219B and 219C cooperatively with the light emitting elements 15.

The light source units 217A, 217B and 217C are provided with a heat radiating portion 213 integral with the unit mounting portion 213. The heat radiating portion 223 is constituted by a heat sink or the like made of, for example, aluminum and arranged with a cooling fin 223a penetrating the lamp body 203 at an outer portion.

Further, a front end portion at inside of the lamp chamber 209 is provided with an extension, not illustrated, to surround the lamp units 211A, 211B and 211C.

Next, constitutions of the lamp units 211A, 211B and 211C will be explained. Further, as shown by FIG. 15, the lamp units 211A, 211B and 211C according to the third exemplary embodiment are respectively constructed by substantially the same constitution, and therefore, an explanation will be given by taking an example of the lamp unit 211C.

As shown by FIG. 16, the lamp unit 211C is constructed by a constitution in which the optical unit 219C fixed to a frame 220 is made to be able to level in the up and down direction relative to the light source unit 217C fixed to the lamp body 203.

The light source unit 217C is constituted by providing the light emitting element 15 constituting the light source at a support portion 213c of the unit mounting portion 213. As described above, the unit mounting portion 213 is integrally provided with the heat radiating portion 223. According to the light source unit 217C, the unit mounting portion 213 is fixed to the lamp body 203 and is not moved in leveling.

Meanwhile, as shown by FIG. 15 and FIG. 16, the optical unit 219C includes the reflector 41, the projecting lens 43 and the shade 45 similar to the optical unit 19C of the first exemplary embodiment.

The optical unit 219C is fixed to the frame 220 along with the other optical units 219A and 219B and the frame 220 is provided with the aiming mechanism 25. The aiming mechanism 25 is made to be able to incline the frame 220 in the left and right direction by the aiming screw 27 surfaced to a back face of the lamp body 203.

Further, the frame 220 is driven to level in the up and down direction by the leveling drive mechanism 221. That is, the leveling drive mechanism 221 controls a light distribution of inclining the optical units 229A, 229B and 229C by rotating the frame 220 in the up and down direction by an actuator 222 constituting a center of rotation by a horizontal axis 250 passing the light emitting element 15 and the first focal point F1 of the reflector 41. When the frame aligned to be arranged with a plurality of lamp units 211A, 211B and 211C is rotated in the up and down direction to drive to swivel in this way, the center of rotation is constituted by the horizontal axis 250 passing the optical element 15, and therefore, the respective light emitting elements 15 are aligned on a horizontal straight line.

The leveling drive mechanism 221 is connected with an electronic control unit, not illustrated, and the electronic control unit detects information showing a situation of running the vehicle by a sensor. The sensor is constituted by, for example, a vehicle height sensor for respectively detecting heights of front and rear axles for detecting a horizontal state (leveling) of the vehicle. The electronic control unit controls to deflect the optical units 219A, 219B and 219C of the vehicle lamp 201 respectively mounted to left and right sides of a front portion of an automobile in the up and down direction based on inputs and outputs of the sensor to automatically change a light distribution characteristic thereof.

As described above, according to the vehicle lamp 201 of the third exemplary embodiment, only the heat radiating portions 223 of the light source units 217A, 217B and 217C which are not made to be movable are arranged from the hermetically sealed lamp chamber 209 to outside of the lamp body 203, at inside of the lamp chamber 209, only the individual optical units 219A, 219B and 219C are made to be movable separately from the light source units 217A, 217B and 217C in a fixed state, and therefore, a movable space ensured at inside of the lamp chamber 209 is made to be necessary minimum, further, also the actuator 222 of the leveling drive mechanism 221 having a small output is made to be able to be adopted. Hence, the outer heat radiating structure is made to be able to be constituted without adopting a complicated seal structure and small-sized/light-weighted formation of the vehicle lamp 201 can be constituted.

Therefore, also by the vehicle lamp 201 of the third exemplary embodiment, the heat radiating performance can be promoted while achieving thin thickness formation and light-weighted formation of the vehicle lamp.

Figure 17:
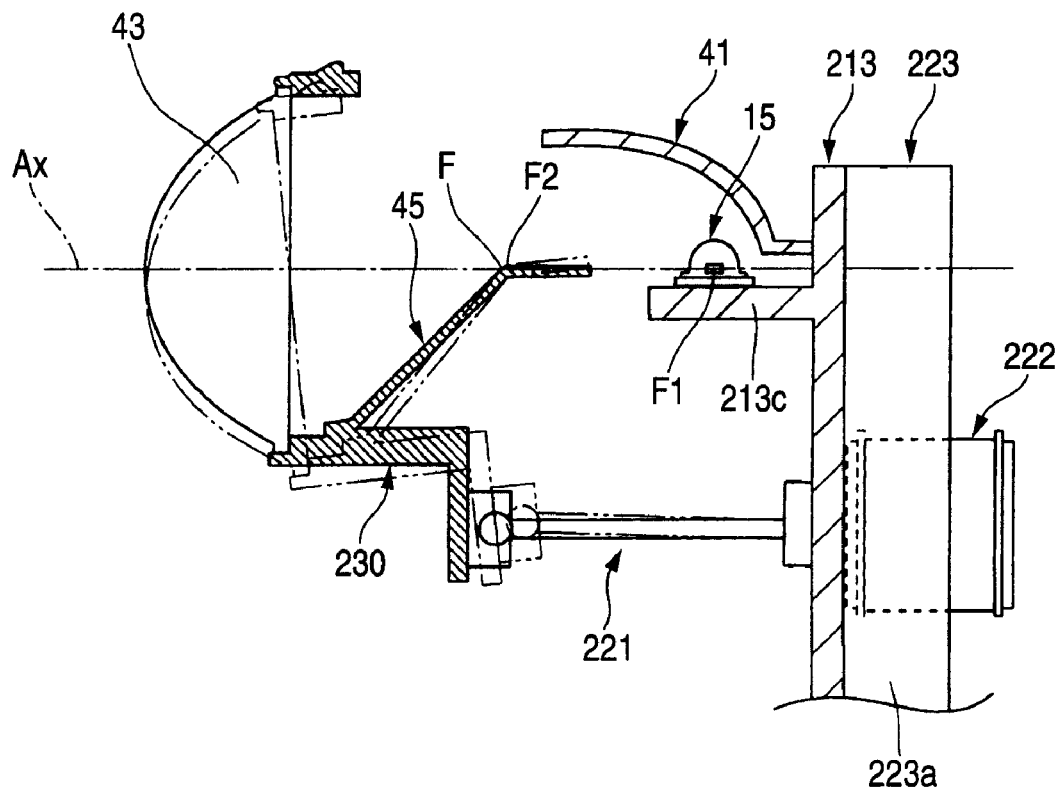
FIG. 17 is an explanatory view of an operation showing a modified example of an auto leveling mechanism shown in FIG. 16.

Further, although the vehicle lamp 201 of the third exemplary embodiment is constructed by a constitution in which the projecting lens 43, the shade 45 and the reflector 41 are driven to level in the up and down direction independently without being moved cooperatively with the light emitting element 15 by constituting a center of rotation by a horizontal axis 250 passing the light emitting element 15 and the first focal point F1 of the reflector 41, as shown by FIG. 17, there may be constructed a constitution in which the projecting lens 43 and the shade 45 are driven to level in the up and down direction independently without being moved cooperatively with the light emitting element 15 by constituting a center of rotation by a horizontal axis passing the rear focal point F of the projecting lens 43 on the optical axis Ax. In this case, the reflector 41 is fixed to the unit mounting portion 213.

Next, a vehicle lamp according to a fourth exemplary embodiment will be explained.

Figure 18:
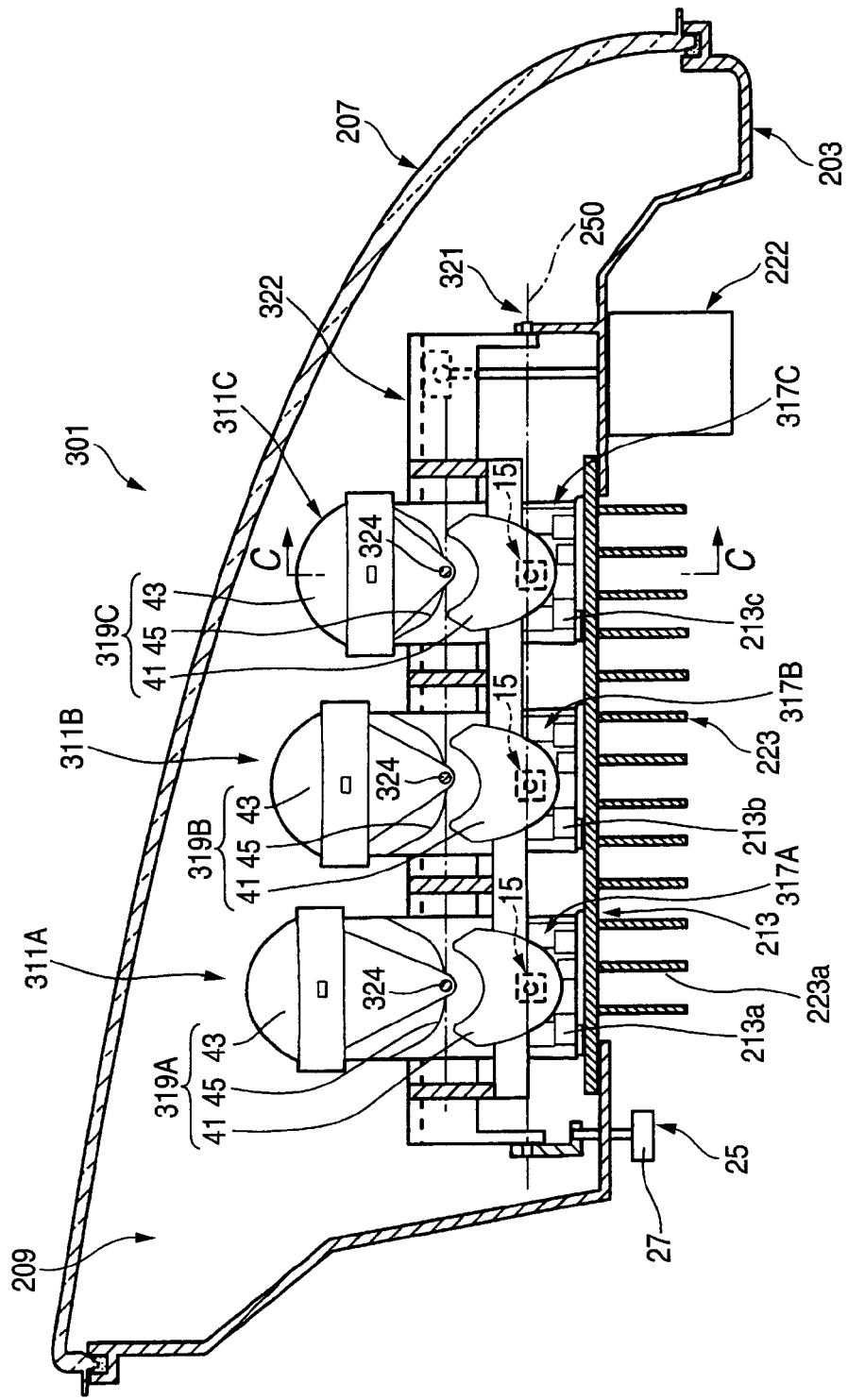
FIG. 18 is a horizontal sectional view of a vehicle lamp according to a fourth exemplary embodiment.
Figure 19:
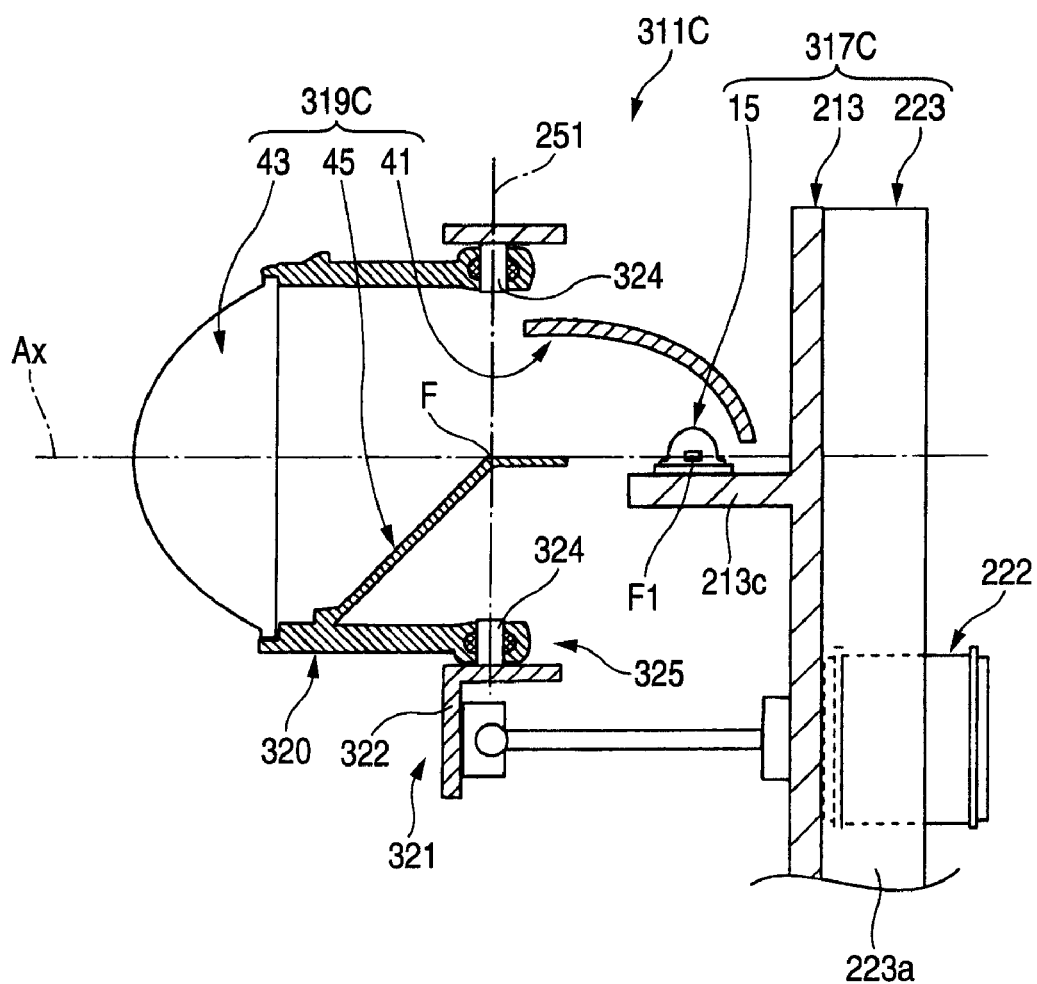
FIG. 19 is a sectional view taken along a line C-C of a lamp unit shown in FIG. 18.

FIG. 18 is a horizontal sectional view of a vehicle lamp according to the fourth exemplary embodiment, and FIG. 19 is a sectional view taken along a line C-C of a lamp unit shown in FIG. 18. Constituent members substantially similar to those of the vehicle lamp according to the third exemplary embodiment are attached with the same notations and a detailed explanation thereof will be omitted.

As shown by FIG. 18, a vehicle lamp 301 according to the fourth exemplary embodiment includes a lamp unit at inside of the lamp chamber 209 formed by the lamp body 203 a front side of which is opened and the transparent front face cover 207 attached to the front opening portion.

The lamp unit according to the fourth exemplary embodiment is constituted by a plurality (3 pieces according to the exemplary embodiment) of lamp units 311A, 311B and 311C, and the lamp units 311A, 311B and 311C are arranged successively from the inner side to the outer side in the width direction (according to the exemplary embodiment, a constitution of a vehicle lamp arranged on a right side of a vehicle body is shown).

As shown by FIG. 18 and FIG. 19, the lamp units 311A, 311B and 311C include light source units 317A, 317B and 317C for irradiating light from the respective light emitting elements 15 to the front side of the vehicle lamp, at the respective support portions 213a, 213b, 213c of the unit mounting portion 213, optical units 319A, 319B, 319C for irradiating light from the respective light emitting elements 15 to the front side of the vehicle lamp, a leveling drive mechanism (drive mechanism) 321 for driving to level the optical units 319A, 319B and 319C independently without being moved cooperatively with the light emitting elements 15, and a swivel drive mechanism (drive mechanism) 325 for respectively driving to swivel the projecting lenses 43 and the shades 45 of the optical units 319A, 319B and 319C.

The light source units 317A, 317B and 317C are provided with the heat radiating portions 233 integral with the unit mounting portion 213. The heat radiating portion 223 is constituted by a heat sink or the like made of, for example, aluminum and arranged with the cooling fin 223a penetrating the lamp body 203 at outside thereof.

Further, the front end portion of inside of the lamp chamber 209 is provided with an extension, not illustrated, to surround the lamp units 311A, 311B and 311C.

Next, constitutions of the lamp units 311A, 311B and 311C will be explained. Further, the lamp units 311A, 311B and 311C according to the fourth embodiment are respectively constructed by substantially the same constitution as shown by FIG. 18, and therefore, an explanation will be given by taking an example of the lamp unit 311C.

As shown by FIG. 19, the lamp unit 311C is constituted such that the projecting lens 43 and the shade 45 of the optical unit 319C fixed to a frame 320 are made to be able to level in the up and down direction and made to be able to swivel in the left and right direction relative to the light source unit 317C fixed to the lamp body 203.

The light source unit 317C is provided with the light emitting element 15 constituting the light source at the support portion 213a of the unit mounting portion 213. As described above, the unit mounting portion 213 is integrally provided with the heat radiating portion 223. According to the light source unit 317C, the unit mounting portion 213 is fixed to the lamp body 203 and is not moved in leveling and swiveling.

On the other hand, as shown by FIG. 18 and FIG. 19, the optical unit 319C includes the reflector 41, the projecting lens 43, and the shade 45 similar to the optical unit 219C of the third exemplary embodiment.

The projecting lens 43 and the shade 45 of the optical unit 319C are fixed to a base member 322 by way of the frame 320 along with the projecting lenses 43 and the shades 45 of the other optical units 319A and 319B, and the base member 322 is provided with the aiming mechanism 25. The aiming mechanism 25 makes the frame 320 inclinable in the left and right direction along with the base member 322 by the aiming screw 27 surfaced to the back face of the lamp body 203.

Further, the frame 320 is driven to level in the up and down direction by the base member 322 of the leveling drive mechanism 321. That is, the base member 322 of the leveling drive mechanism 321 carries out a light distribution control of inclining the optical units 319A, 319B and 319C by rotating the frame 320 in the up and down direction by the actuator 222 by constituting the center of rotation by the horizontal axis 250 passing the light emitting element 15 and the first focal point F1 of the reflector 41. In this way, when the base member 322 aligned to arrange with the plurality of lamp units 311A, 311B and 311C is rotated in the up and down direction to drive to level, the horizontal axis 250 passing the light emitting element 15 constitutes the center of rotation, and therefore, the respective light emitting elements 15 are aligned in a horizontal straight line.

The leveling drive mechanism 321 is connected with an electronic control unit, not illustrated, and the electronic control unit detects information showing a running situation of a vehicle by a sensor. The sensor is constituted by a vehicle height sensor for detecting respective heights of front and rear axles for detecting, for example, a horizontal state (leveling) of a vehicle. The electronic control unit controls to deflect the optical units 319A, 319B and 319C of the vehicle lamp 301 respectively mounted to left and right side of a front portion of an automobile in the up and down direction based on an inputted output of the sensor to automatically change a light distribution characteristic thereof.

The projecting lenses 24 and the shades 45 of the optical units 319A, 319B and 319C are supported by the frame 320 independently pivotably by rotating shafts 324 of the base member 322 respectively extended in the vertical direction and are driven to swivel by the swivel drive mechanism 325.

As shown by FIG. 19, the swivel drive mechanism 325 according to the embodiment swivels the respective projecting lenses 43 and the shades 45 of the optical units 319A, 319B and 319C fixed to the frame 320 by constituting the center of rotation by the vertical axis 251 passing the rear focal point F of the projecting lens 43 on the optical axis Ax in the left and right direction independently without being moved cooperatively with the light emitting elements 15. Further, the reflector 41 is fixed to the base member 322 and is not swiveled.

Further, when the plurality of lamp units 311A, 311B and 311C are aligned, the respective light emitting elements 15 are aligned on a straight line since the horizontal rotating axis 250 is constituted by a vicinity of a center of the light emitting element 15. Here, it is necessary to align the light emitting elements 15 on a horizontal line, and therefore, as shown by FIG. 18, the lamp units 311A, 311B and 311C are aligned to shift in the front and rear direction from a restriction of a layout, and therefore, the projecting lenses 43 having different focal lengths are used. Further, for example, this can also be adjusted by using the reflectors 41 having different focal lengths, or making focal lengths of both of the projecting lens 43 and the reflector 41 differ.

As described above, according to the vehicle lamp 301 of the fourth exemplary embodiment, only the heat radiating portions 223 of the lamp units 317A, 317B and 317C which are not movable from the hermetically closed lamp chamber 209 are arranged to outside of the body 203, and at inside of the lamp chamber 209, only the individual optical units 319A, 319B and 319C are made to be movable separately from the light source units 317A, 317B and 317C in a fixed state, and therefore, the movable space ensured at inside of the lamp chamber 209 can be made to be necessary minimum, further, also the actuator of the leveling drive mechanism 321 or the swivel drive mechanism 32 having a small output can be adopted. Hence, an outer heat radiating structure can be constituted without adopting a complicated seal structure and small-sized/light-weighted formation of the vehicle lamp 301 can be constituted.

Therefore, also by the vehicle lamp 301 of the fourth exemplary embodiment, the heat radiating performance can be promoted while achieving thin thickness formation and light-weighted formation of the vehicle lamp.

Further, the vehicle lamp 301 of the fourth exemplary embodiment is constructed by a constitution in which the projecting lens 43 and the shade 45 fixed to the frame 320 are driven to level in the up and down direction by constituting a center of rotation by the horizontal axis passing the light emitting element 15 and the first focal point F1 of the reflector 41 independently without moving the reflector 41 fixed to the base member 322 and the light emitting element 15 cooperatively therewith, and the projecting lens 43 and the shade 45 fixed to the frame 320 is driven to swivel in the left and right direction by constituting the center of rotation by the vertical axis 251 passing the rear focal point F of the projecting lens 43 on the optical axis Ax independently without being moved cooperatively with the light emitting element 15.

Figure 20:
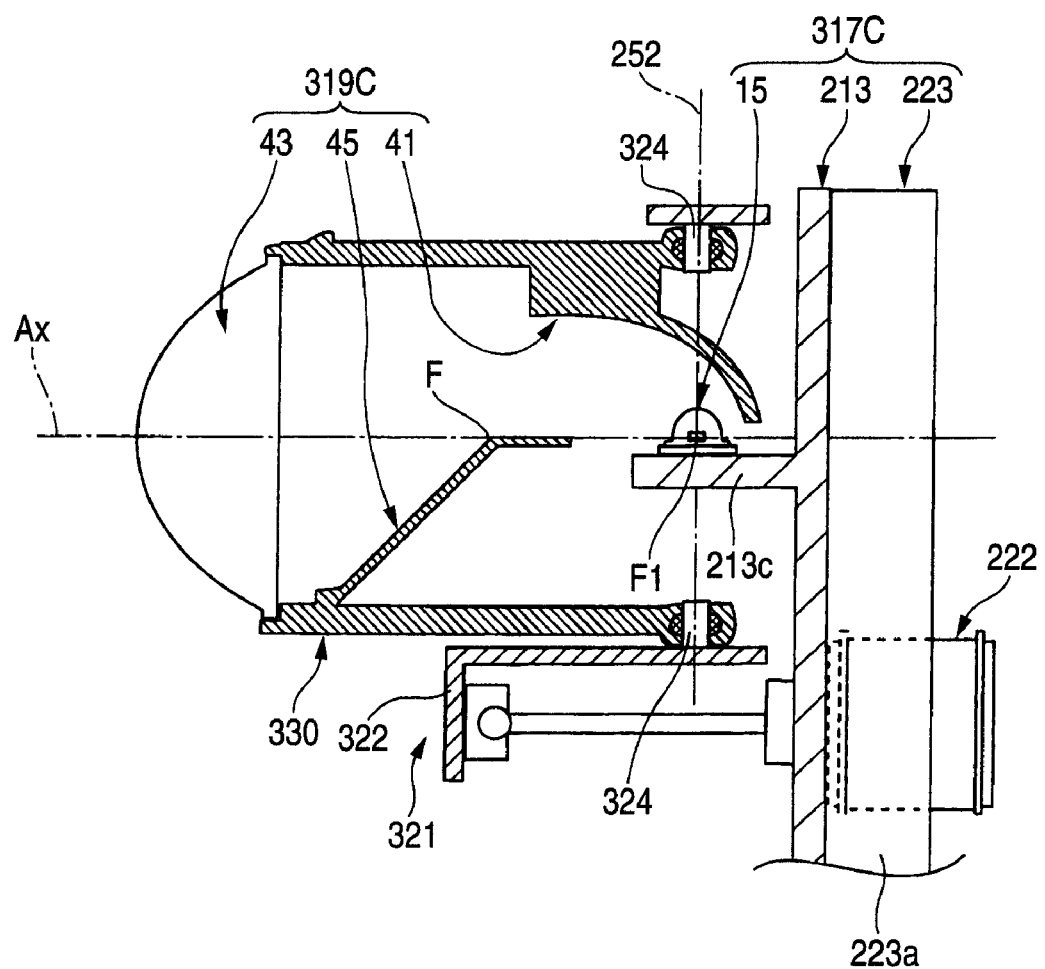
FIG. 20 is a sectional view showing a modified example of an auto leveling mechanism and a swivel mechanism shown in FIG. 19.

In contrast thereto, there can also be constructed a constitution in which as shown by FIG. 20, the projecting lens 43, the shade 45 and the reflector 41 fixed to a frame 330 are driven to level in the up and down direction by constituting a center of rotation by the horizontal axis 250 passing the light emitting element 15 and the first focal point F1 of the reflector 41 without being moved cooperatively with the light emitting element 15, and the projecting lens 43, the shade 45 and the reflector 41 are driven to swivel in the left and right direction by constituting a center of rotation by the vertical axis 252 passing the light emitting element 15 and the first focal point F1 and the reflector 41 on the optical axis Ax independently without being moved cooperatively with the light emitting element 15.

Next, a vehicle lamp according to a fifth exemplary embodiment will be explained.

Figure 21:
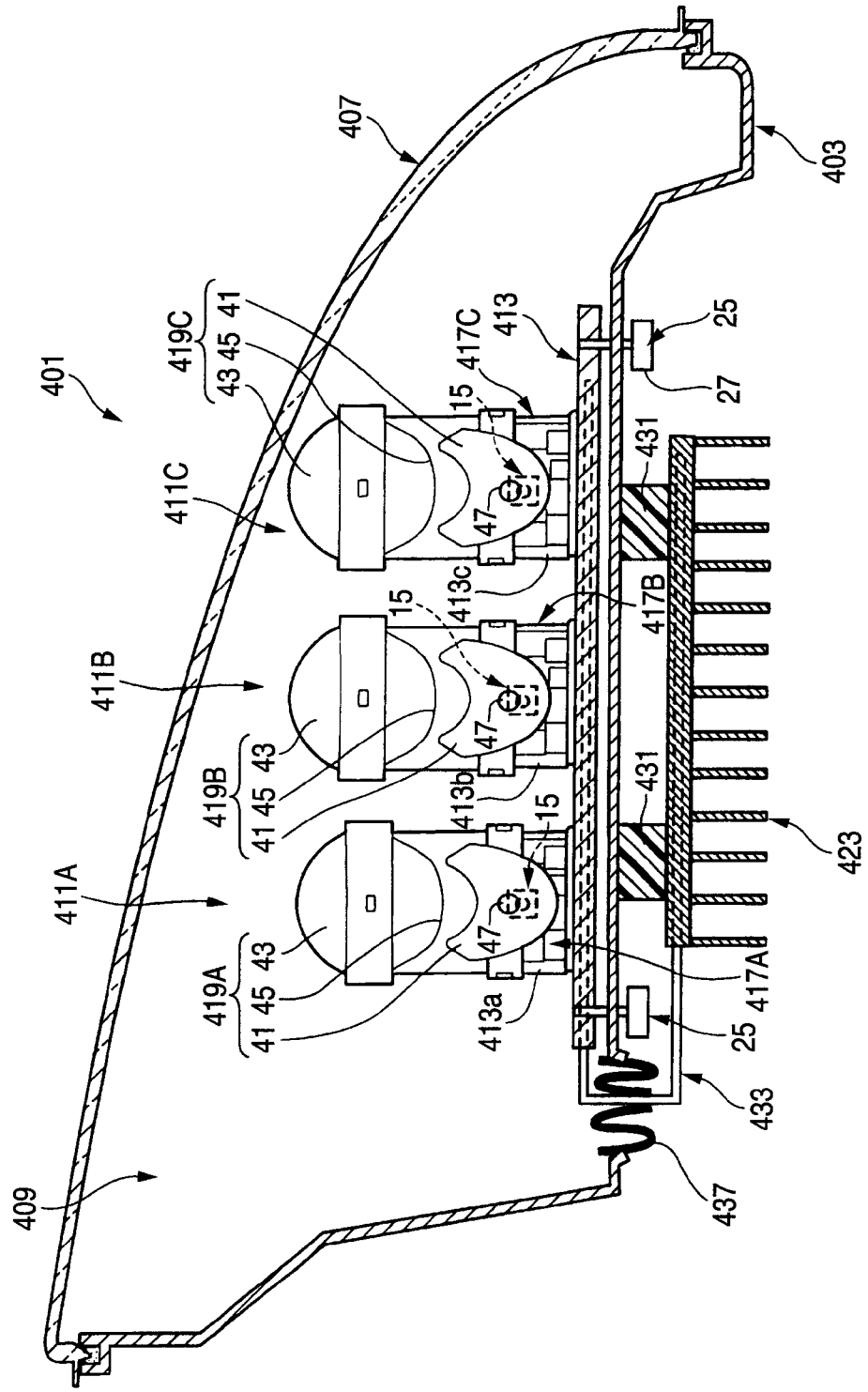
FIG. 21 is a horizontal sectional view of a vehicle lamp according to a fifth exemplary embodiment.
Figure 22A:
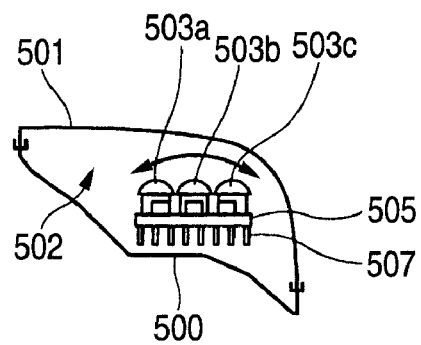
FIG. 22A illustrates an explanatory view showing a vehicle lamp of a background art.
Figure 22B:
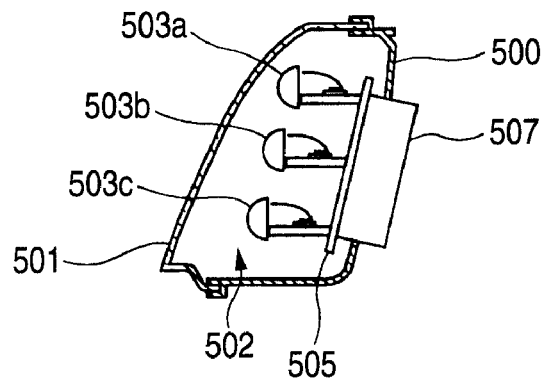
FIGS. 22B and 22C illustrate explanatory views showing a vehicle lamp of a related art.
Figure 22C:
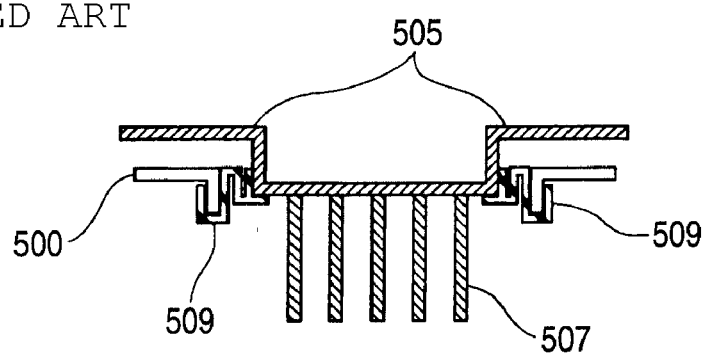

FIG. 21 is a horizontal sectional view of a vehicle lamp according to the fifth exemplary embodiment. Constituent members substantially similar to those of the vehicle lamp of the first embodiment are attached with the same notations and a detailed explanation thereof will be omitted.

As shown by FIG. 21, a vehicle lamp 401 according to the fifth exemplary embodiment includes a lamp unit at inside of a lamp chamber 409 formed by a lamp body 403 a front side of which is opened and a transparent front face cover 407 attached to the front opening portion.

The lamp unit of the exemplary embodiment is constituted by a plurality (3 pieces according to the exemplary embodiment) of lamp units 411A, 411B and 411C, and the lamp units 411A, 411B and 411C are arranged successively from an inner side to an outer side in a width direction (according to the exemplary embodiment, a constitution of a vehicle lamp arranged on a right side of a vehicle body is shown).

The lamp units 411A, 411B and 411C include light source units 417A, 417B and 417C supporting the light emitting elements 15 at respective support portions 413a, 413b and 413c of a unit mounting portion 413, and optical units 419A, 419B and 419C for irradiating light of the respective light emitting elements 15 to a front side of the vehicle lamp, and a swivel drive mechanism (drive mechanism) for driving to swivel the optical units 419A, 419B and 419C independently without being moved cooperatively with the light emitting elements 15. Further, the swivel drive mechanism (not illustrated) of the embodiment provided at the unit mounting portion 413 can adopt a constitution substantially similar to the swivel drive mechanism 21 of the vehicle lamp 1 of the first exemplary embodiment and a detailed explanation thereof will be omitted.

The light source units 417A, 417B and 417C are provided with a heat radiating portion 423 integrally with the unit mounting portion 413. The heat radiating portion 423 is constituted by a heat sink or the like made of, for example, aluminum and is arranged at outside of the lamp body 403.

The unit mounting portion 413 arranged at inside of the lamp chamber 409 and the heat radiating portion 423 arranged at outside of the lamp chamber 409 are connected by way of a heat conducting member 433 penetrating the lamp body 403.

The unit mounting portion 413 provided with the light source units 417A, 417B and 417C is mounted on an inner side of the lamp body 403 by way of the aiming mechanism 25, and is connected to the heat radiating portion 423 arranged at outside of the lamp body 403 by way of the heat conducting member 433, and therefore, heat of the light source units 417A, 417B and 417C is conducted to the heat radiating portion by a short distance and an excellent heat conduction, and a high cooling efficiency is achieved. Thereby, in comparison with an inner heat radiating structure, a size of the heat radiating portion 423 can be reduced, which contribute to small-sized formation, light-weighted formation, thin size formation of a total of the vehicle lamp 401.

As the heat conducting member 433, it is further preferable to use a heat pipe connecting the single unit mounting portion 413 directly attached with the plurality of light source units 417A, 417B and 417C and the heat radiating portion 423.

According to the heat pipe, the heat radiating portion 423 is brought into close contact with a heat discharge portion thereof, and the unit mounting portion 413 of the respective light source units 417A, 417B and 417C fixed with the light emitting elements 15 is brought into close contact with a heat absorb portion thereof. The heat pipe is filled with a work fluid of a small amount of water or substitute freon or the like at inside of a closed pipe, and the work fluid is vaporized by inputting heat from the heat absorb portion and heat is inputted as vaporization heat. The vaporized work fluid is condensed by being cooled at the heat discharge portion and is recirculated to the heat absorb portion by a capillary phenomenon by a number of slender pipes, slender grooves or the like provided in an axis line direction at an inner face of the pipe. By circulating the work fluid, the unit mounting portion 413 brought into close contact with the heat absorb portion is cooled.

Further, the unit mounting portion 413 is provided with the aiming mechanism 25, and the aiming mechanism 25 makes the unit mounting portion 413 inclinable in the up and down direction and in the left and right direction by the screws 27 and 28 surfaced to the back face of the lamp body 403.

Further, a damp member 431 constituted by a rubber material or the like is interposed between the unit mounting portion 413 and the heat radiating portion 423, and the damp member 431 fixes the heat radiating portion 423 to the lamp body 403 while absorbing movement by the aiming mechanism 25. Further, the damp member 431 is dispensed with when the heat conducting member 433 is constituted by a flexible heat pipe having a flexibility, and the heat radiating portion 423 can directly be attached integrally to the lamp body 403.

As described above, according to the vehicle lamp 401 of the fifth exemplary embodiment, only the heat radiating portion 423 of the light source units 417A, 417B and 417C which are not movable are arranged from the hermetically closed lamp chamber 409 to outside of the lamp body 403, and only the individual optical units 419A, 419B and 419C are made to be movable at inside of the lamp chamber 409 separately from the light source units 417A, 417B and 417C in the fixed state, and therefore, the movable space ensured at inside of the lamp chamber 409 can be made to be necessary minimum.

Further, heat transfer between the unit mounting portion 413 and the heat radiating portion 423 can be carried out highly efficiently by the work fluid circulated at inside of the heat pipe by connecting the heat radiating portion 423 to the single mounting portion 413 fixed with the plurality of the light source units 417A, 417B and 417C by way of the heat conducting member 433 constituted by the heat pipe. Thereby, a through hole of the lamp body 403 for inserting the heat conducting member 433 is made to be small. Further, the through hole is provided with the seal member of a packing 437 or the like for absorbing the movement of the aiming mechanism 25.

While description has been made in connection with specific embodiments and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

Description of Reference Numerals and Signs 1 vehicle lamp
3 lamp body
5 front opening portion
7 front face cover
9 lamp chamber
11A, 11B, 11C lamp units
13 unit mounting portion
15 light emitting element
17A, 17B, 17C light source units
19A, 19B, 19C optical units
21 swivel drive mechanism (drive mechanism)
23 heat radiating portion
35 heat pipe
41 reflector
43 projecting lens
47 rotating shaft
Ax optical axis extended in front and rear direction of vehicle
F rear side focal point of projecting lens
F1 first focal point of reflector
F2 second focal point of reflector

What is claimed is:
1. A vehicle lamp comprising:
a lamp body including a front side opening portion;
a transparent front face cover attached to the front side opening portion; and
a lamp unit disposed in a lamp chamber formed by the lamp body and the transparent front face cover, wherein the lamp unit includes:
a light source unit configured to support a light emitting element on a unit mounting portion;
an optical unit configured to irradiate light from the light emitting element to a front side of the vehicle lamp; and
a drive mechanism configured to drive the optical unit without cooperatively moving with the light emitting element,
wherein the light source unit is formed by integrating the unit mounting portion and a heat radiating portion,
wherein the light source unit is arranged by penetrating the lamp body;
wherein the optical unit includes a projecting lens arranged on an optical axis extended in a front and rear direction of a vehicle, and a reflector configured to condense and reflect direct light from to the projecting lens, the light emitting element being arranged so that a light source directs to an upper side, and
wherein the drive mechanism is configured to swivel the reflector and the projecting lens in a left and right direction around a rotating shaft disposed on a front side of the light emitting element.

2. The vehicle lamp according to claim 1, wherein the unit mounting portion arranged at an inside of the lamp chamber and the heat radiating portion arranged at an outside of the lamp chamber are connected by a heat conducting member penetrating the lamp body.

3. A vehicle lamp comprising:
a lamp body including a front side opening portion;
a transparent front .face cover attached to the front side opening portion; and
a lamp unit disposed in a lamp chamber formed by the lamp body and the transparent front face cover,
wherein the lamp unit includes:
a light source unit configured to support a light emitting element on a unit mounting portion;
an optical unit configured to irradiate light from the light emitting element to a front side of the vehicle lamp; and
a drive mechanism configured to drive the optical unit without cooperatively moving with the light emitting element,
wherein the light source unit is formed by integrating the unit mounting portion and a heat radiating portion,
wherein the light source unit is arranged by penetrating the lamp body;
wherein the unit mounting portion arranged at an inside of the lamp chamber and the heat radiating portion arranged at an outside of the lamp chamber are connected by a heat conducting member penetrating the lamp body; and
wherein the heat conducting member comprises a heat pipe connecting a single unit mounting portion directly attached with a plurality of the light emitting elements and the heat radiating portion.

4. A vehicle lamp comprising:
a lamp body including a front side opening portion;
a transparent front face cover attached to the front side opening portion; and
a lamp unit disposed in a lamp chamber formed by the lamp body and the transparent front face cover,
wherein the lamp unit includes:
a light source unit configured to support a light emitting element on a unit mounting portion;
an optical unit configured to irradiate light from the light emitting element to a front side of the vehicle lamp; and
a drive mechanism configured to drive the optical unit without cooperatively moving with the light emitting element,
wherein the light source unit is formed by integrating the unit mounting portion and a heat radiating portion, and
wherein the light source unit is arranged by penetrating the lamp body;
wherein the lamp unit includes a plurality of light source units,
wherein the respective light emitting elements of the plurality of light source units are supported by a common unit mounting portion, and the optical units are individually set to the respective light emitting elements, and
wherein the plurality of optical units are driven to be cooperatively moved by different strokes by a single drive mechanism.

* * * * *